United States Patent
Lee et al.

(10) Patent No.: US 10,708,824 B2
(45) Date of Patent: Jul. 7, 2020

(54) METHOD AND APPARATUS FOR SUPPORTING SESSION CONTINUITY FOR 5G CELLULAR NETWORK

(71) Applicant: Samsung Electronics Co., Ltd., Suwon-si, Gyeonggi-do (KR)

(72) Inventors: Jicheol Lee, Suwon-si (KR); Jinsung Lee, Suwon-si (KR); Jungshin Park, Seoul (KR); Kisuk Kweon, Suwon-si (KR); Sangjun Moon, Seoul (KR); Beomsik Bae, Suwon-si (KR); Hyungho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/974,198

(22) Filed: May 8, 2018

(65) Prior Publication Data

US 2018/0324646 A1    Nov. 8, 2018

(30) Foreign Application Priority Data

May 8, 2017  (KR) .......................... 10-2017-0057475

(51) Int. Cl.
*H04W 36/38* (2009.01)
*H04W 36/00* (2009.01)
*H04W 36/08* (2009.01)

(52) U.S. Cl.
CPC ....... *H04W 36/0016* (2013.01); *H04W 36/38* (2013.01); *H04W 36/0033* (2013.01); *H04W 36/08* (2013.01)

(58) Field of Classification Search
CPC .. H04W 36/38; H04W 36/00; H04W 36/0016
USPC ........................................................ 370/331
See application file for complete search history.

(56) References Cited

U.S. PATENT DOCUMENTS

| | | | |
|---|---|---|---|
| 2008/0032695 | A1 | 2/2008 | Zhu et al. |
| 2013/0053034 | A1 | 2/2013 | Lee et al. |
| 2015/0188810 | A1 | 7/2015 | Salkintzis |
| 2018/0115928 | A1* | 4/2018 | Kim ................. H04W 36/0061 |
| 2018/0199240 | A1* | 7/2018 | Dao ..................... H04W 36/14 |
| 2018/0270715 | A1* | 9/2018 | Lee .................. H04W 36/0022 |

(Continued)

OTHER PUBLICATIONS

3GPP TS 23.502 V0.3.0 (Mar. 2017), Technical Specification, 3rd Generation Partnership Project; Technical Specification Group Services and System Aspects; Procedures for the 5G System; Stage 2 (Release 15), 115 pages.

(Continued)

*Primary Examiner* — Phong La

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to a method for supporting a session continuity for a terminal in a 5G cellular wireless communication system.

18 Claims, 20 Drawing Sheets

(56) References Cited

U.S. PATENT DOCUMENTS

| | | | | |
|---|---|---|---|---|
| 2018/0270888 A1* | 9/2018 | Faccin | .................. | H04W 76/15 |
| 2018/0270894 A1* | 9/2018 | Park | ..................... | H04W 76/27 |
| 2018/0279180 A1* | 9/2018 | Lee | .................. | H04W 36/0022 |
| 2018/0324631 A1* | 11/2018 | Jheng | .................... | H04W 76/27 |
| 2019/0090164 A1* | 3/2019 | Ding | ..................... | H04L 29/08 |
| 2019/0098536 A1* | 3/2019 | Qiao | ................ | H04W 36/0016 |
| 2019/0124572 A1* | 4/2019 | Park | ..................... | H04W 76/27 |

OTHER PUBLICATIONS

International Search Report dated Aug. 24, 2018 in connection with International Patent Application No. PCT/KR2018/005288, 3 pages.
InterDigital, "Update to 6.5.2 Enabling (re)selection of efficient user plane paths", SA WG2 Meeting #117, Oct. 17-21, 2016, 6 pages, S2-166095.
Samsung, "Updates to Session Continuity Section", SA WG2 Meeting #117, Oct. 17-21, 2016, 2 pages, S2-165743.
"3rd Generation Partnership Project; Technical Specification Group Services and System Aspects; Study on Architecture for Next Generation System (Release 14)", 3GPP TR 23.799 v14.0.0 (Dec. 2016), 522 pages.
Supplementary European Search Report in connection with European Application No. 18799245.8 dated Apr. 7, 2020, 9 pages.
Ericsson, "23.501: UPF and SMF Service Areas," S2-171750 (revision of S2-17xxxx), SA WG2 Temporary Document, SA WG2 Meeting #120, Busan, Korea, Mar. 27-31, 2017, 8 pages.

* cited by examiner

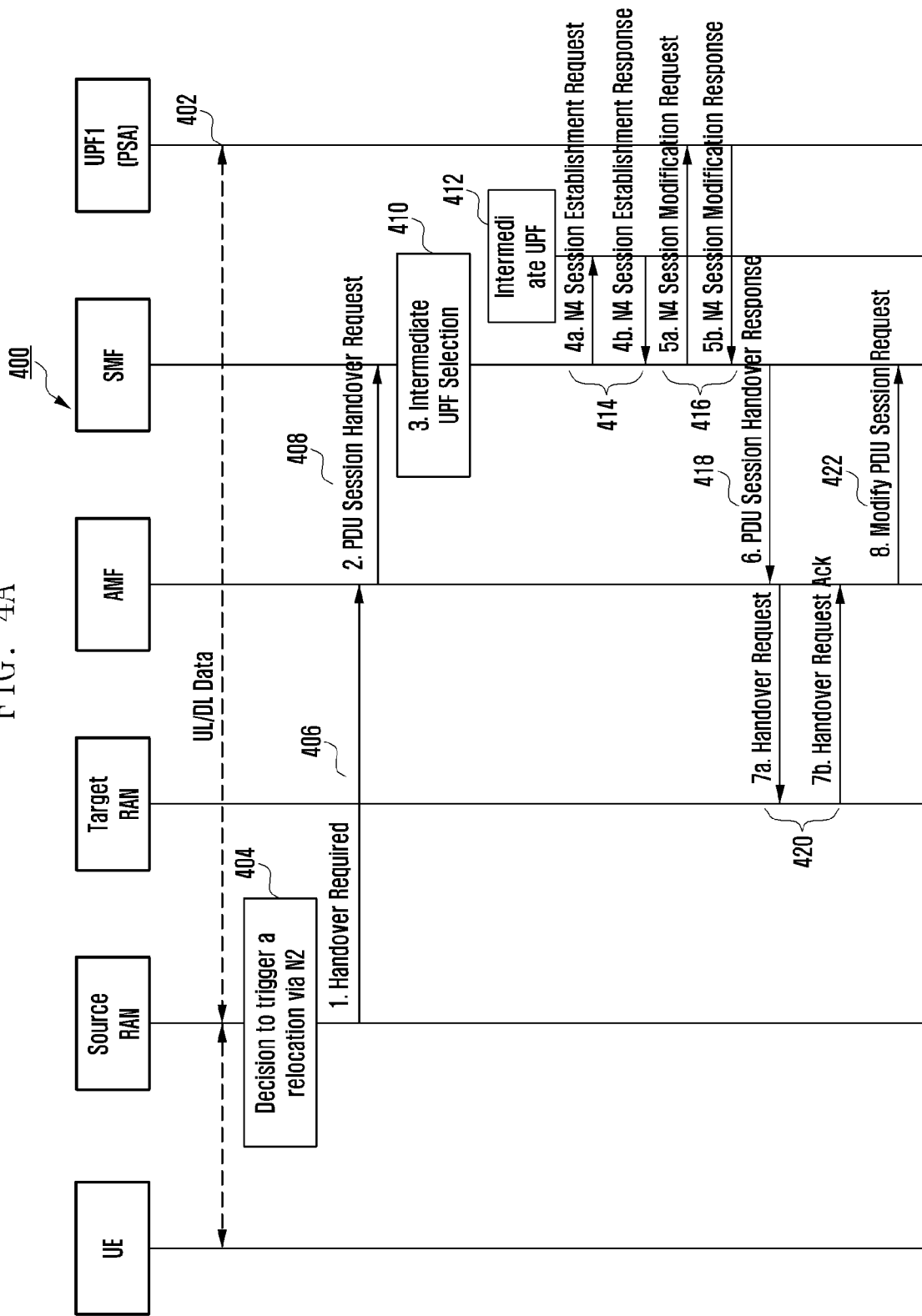

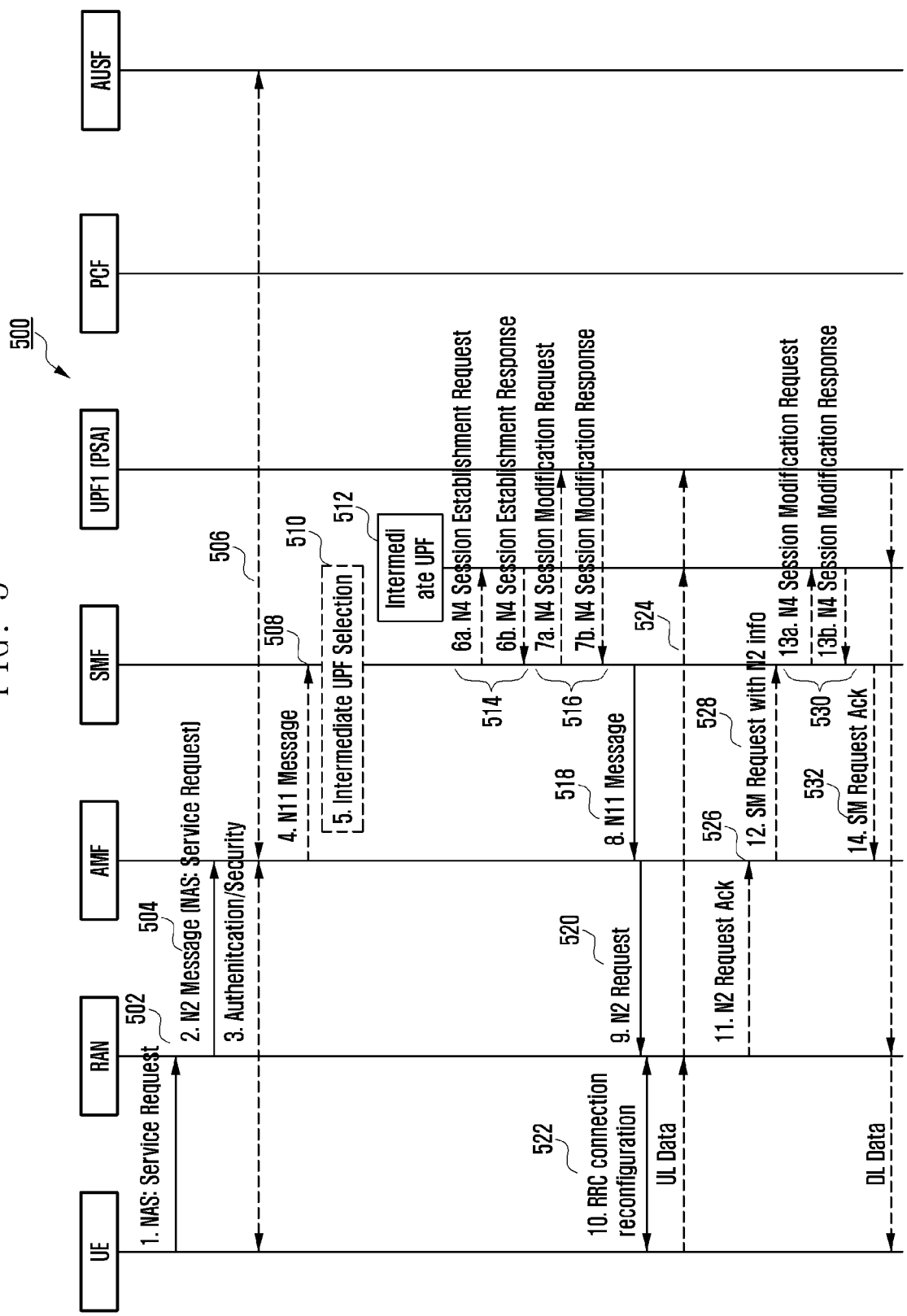

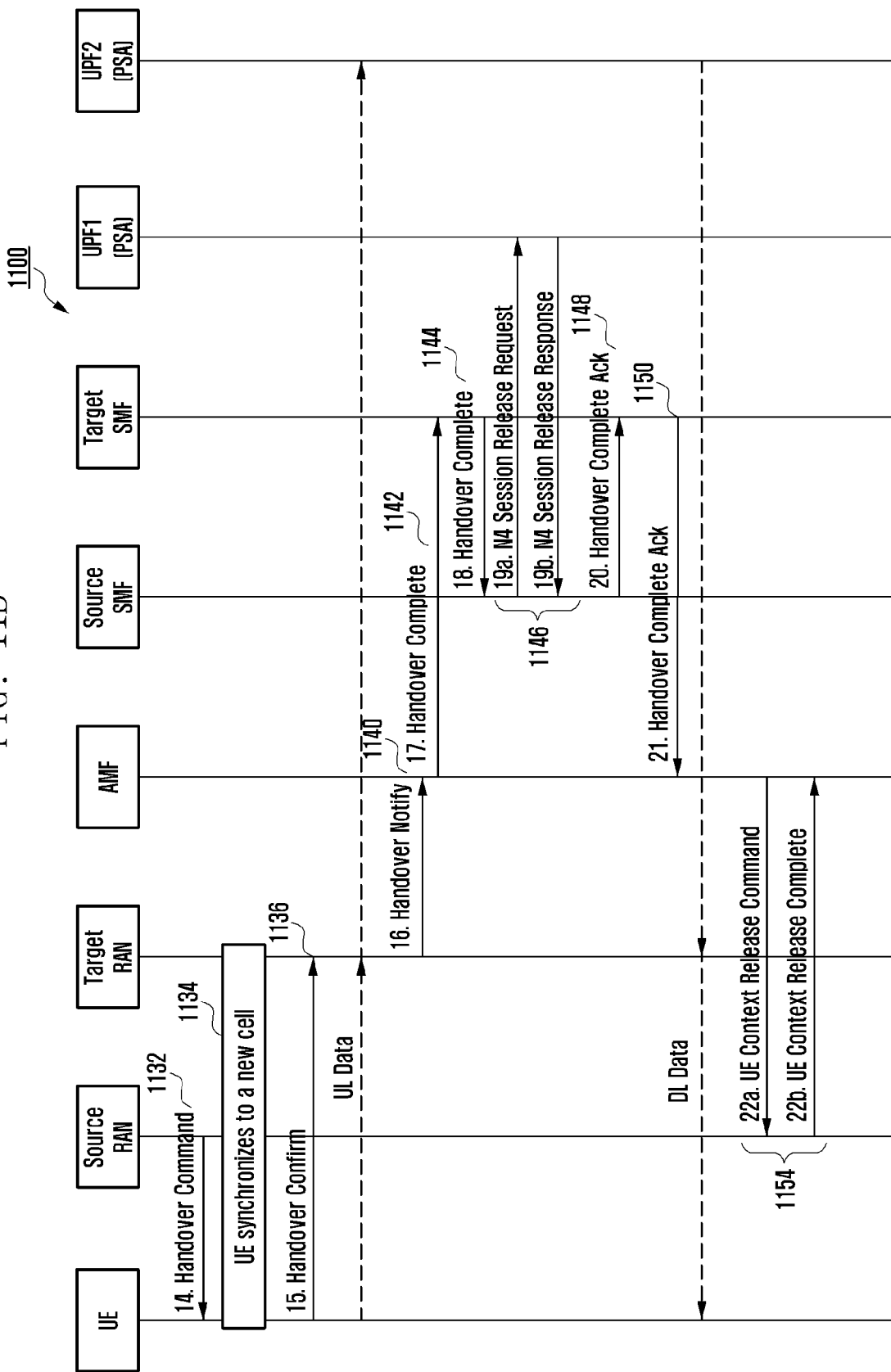

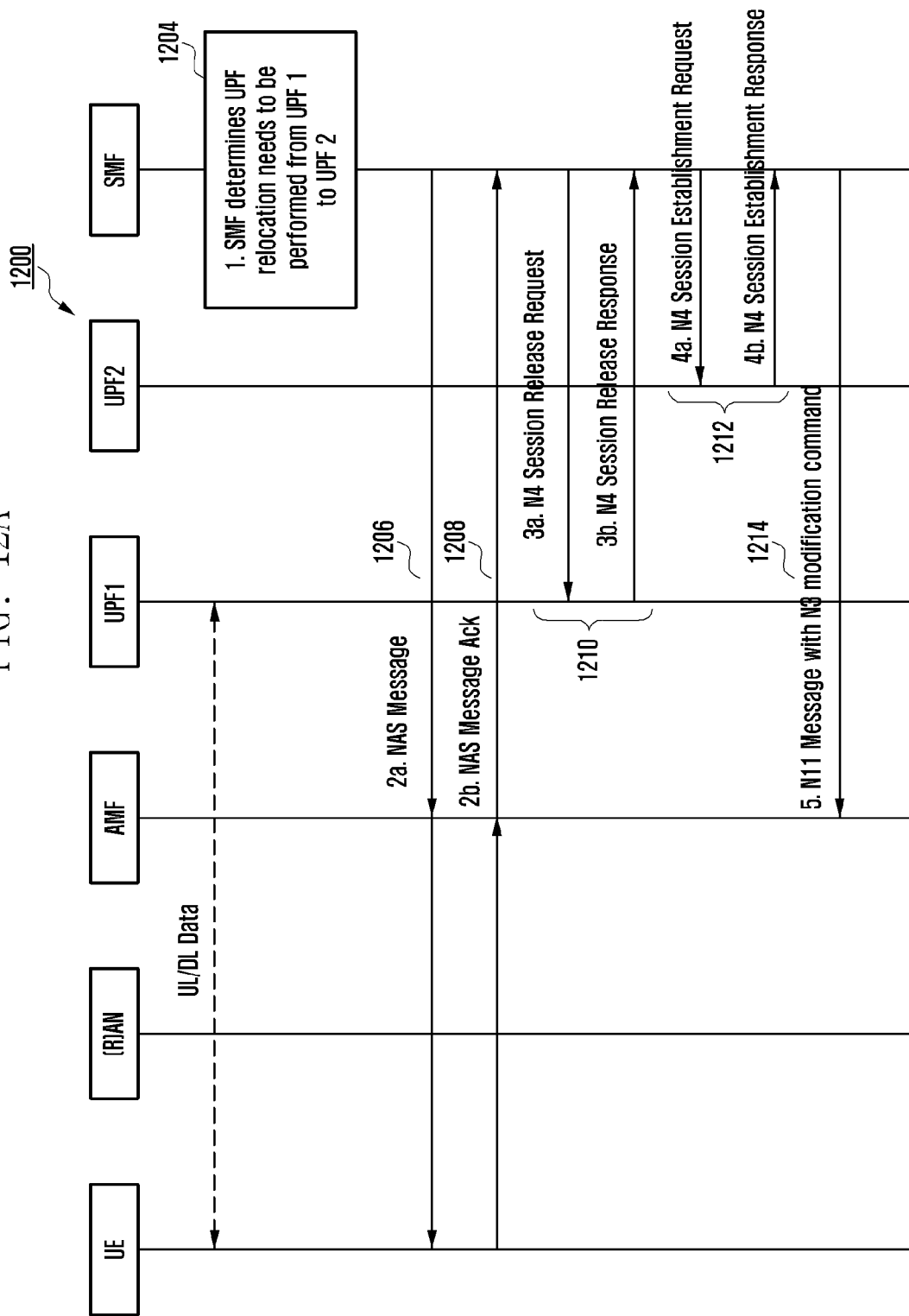

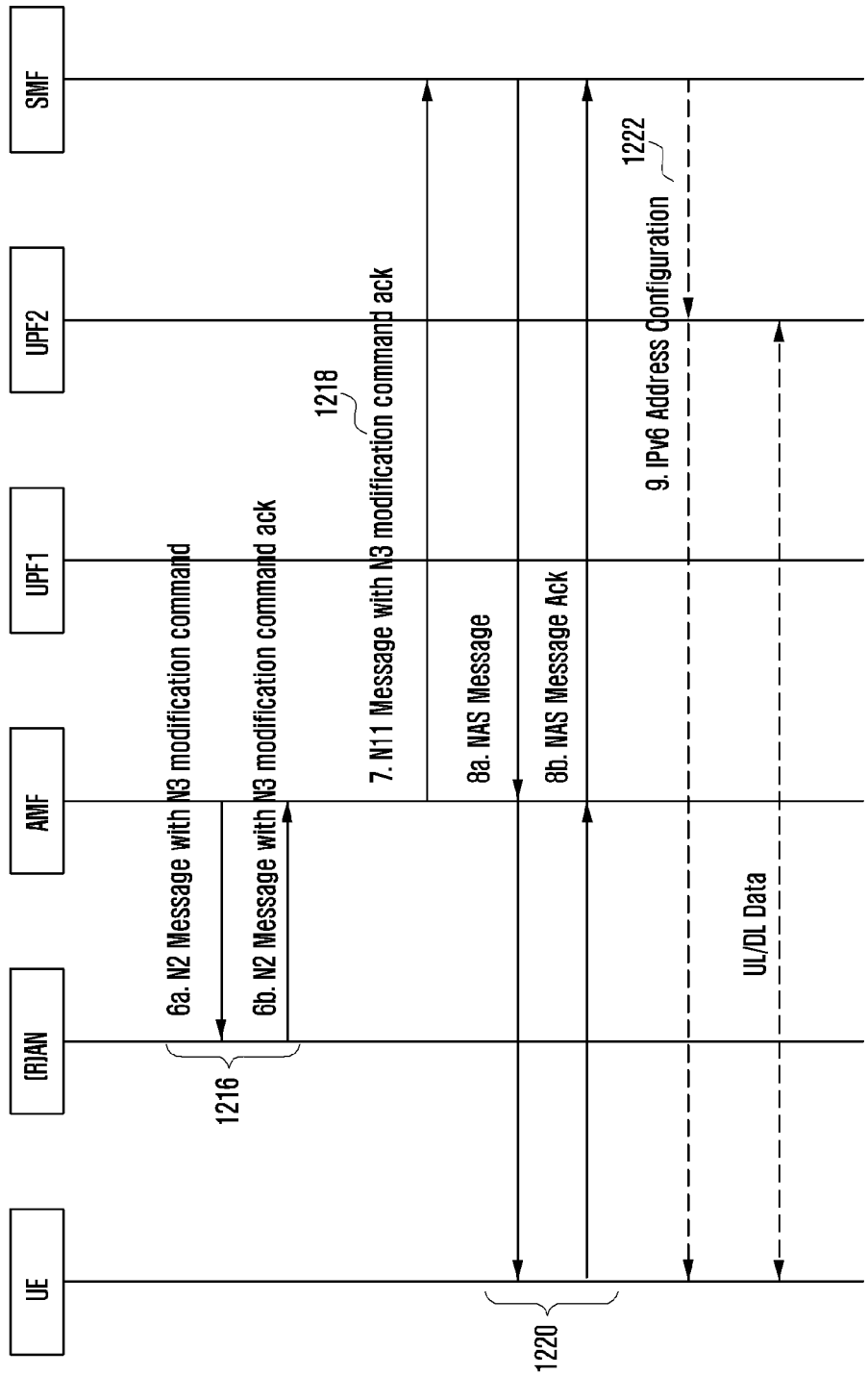

METHOD AND APPARATUS FOR SUPPORTING SESSION CONTINUITY FOR 5G CELLULAR NETWORK

CROSS-REFERENCE TO RELATED APPLICATION(S) AND CLAIM OF PRIORITY

This application is based on and claims priority under 35 U.S.C. § 119 to Korean Patent Application No. KR 10-2017-0057475 filed on May 8, 2017 in the Korean Intellectual Property Office, the disclosure of which is incorporated herein by reference in its entirety.

BACKGROUND

1. Field

The present disclosure relates to a method and apparatus for supporting a session continuity for a terminal in a 5G cellular wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The 3rd Generation Partnership Project (3GPP), which is in charge of cellular mobile communication standard, is working on the standardization of a new core network structure named as 5G core (5GC) in order to evolve from the 4G LTE system to the 5G system.

Compared to an evolved packet core (EPC) which is a network core for the 4G system, the 5GC for the 5G system supports differentiated functions, as follows. First, a network slice function is introduced. As requirements of the 5G system, the 5GC should support various terminal types and service types, for example, enhanced mobile broadband (eMBB), ultra reliable low latency communications (URLLC), and massive machine type communications (mMTC). Such terminals and services have different requirements for the core network. For example, the eMBB service requires a high data rate, and the URLLC service requires a high stability and a low latency. A network slice scheme is a technique proposed to satisfy these various service requirements. The network slice scheme is to virtualize a single physical network and thereby create multiple logical networks. Respective network slice instances (NSIs) may have different characteristics. This is made possible when each NSI has a network function (NF) adapted to the characteristics thereof. It is possible to effectively support various 5G services by allocating the NSIs suitable for the characteristics of a service requested by each terminal.

Second, it is easy to support the network virtualization paradigm through separation of mobility management and session management functions. In the 4G LTE, all terminals can perform services in the network through an exchange of signaling with a single core device called a mobility management entity (MME) that performs all functions of registration, authentication, mobility management, and session management. However, in the 5G system, because the number of terminals is explosively increased and also the mobility and traffic/session characteristics to be supported are varied depending on terminal types, supporting all functions at a single device such as the MME may lower scalability capable of adding an entity according to a required function. Therefore, in order to improve the scalability, various functions are being developed based on a structure for separating the mobility management and session management functions in terms of function/implementation complexity and signaling load of the core device responsible for a control plane. FIG. 1 shows network architecture for the 5G system. As shown in FIG. 1, an access and mobility management function (AMF) 120 for managing the mobility and network registration of a terminal (i.e., UE) 110 and a session management function (SMF) 130 for managing an end-to-end session are separated from each other. The AMF 120 and the SMF 130 may exchange signaling with each other through N11 interface.

Third, a service and session continuity (SSC) mode is introduced to support the requirements on various types of continuity for applications or services of the terminal, and the SSC mode may be designated and used for each PDU session. There are three SSC modes. SSC Mode 1 is a mode that does not change an anchor UPF 140 (or a PDU session anchor (PSA)), which is a communication interface with an external data network (DN), while a corresponding session is maintained, including a case where the UE 110 moves. In this mode, because an IP address/prefix assigned to the session is not changed, the session continuity at the IP level can be achieved. SSC Modes 2 and 3 allow a change (i.e., relocation) of the above-mentioned anchor UPF. A difference between both modes is that SSC Mode 2 releases a connection with a current anchor UPF and immediately establishes a connection with a new anchor UPF, whereas SSC Mode 3 is able to maintain a connection with a current anchor UPF while establishing a connection with a new anchor UPF. Thus, the SSC Mode 3 session allows simultaneous data transmission through a plurality of anchor UPFs with respect to the same external DN (i.e., make-before-break scheme). However, the SSC Mode 2 session based on a break-before-make scheme may cause a service interruption when changing the anchor UPF at the time of transmitting terminal traffic, even though causing small overhead for inter-entity signaling and tunnel management in the core network.

Fourth, a policy control function (PCF), which is a server for managing an operator policy for a terminal, can store policies for session request and selection with respect to respective terminals and provide the policy to each terminal in order for an operator to route terminal traffic. This policy is called a UE route selection policy (URSP). In particular, the URSP may include a network slice selection policy (NSSP) for supporting network slicing technique, an SSC mode selection policy (SSCMSP) for supporting the SSC mode, and a data network name (DNN) selection policy for selecting a DNN corresponding to an access point name (APN) used in the EPC. The URSP may be managed in conjunction with a traffic filter to indicate a rule for specific traffic. In order to deliver UE-specific URSP to a terminal, the PCF may first send it to the AMF via a standard interface (e.g., N15), and then the AMF may deliver it to the terminal via a standard interface (e.g. N1) by means of non access stratum (NAS) signaling.

SUMMARY

The present disclosure provides a procedure and signaling for maintaining a session continuity by inserting a new UPF between a new base station and an anchor UPF if a connection is unavailable between the new base station and the anchor UPF when a 5G terminal, which sets up a data transmission path of session through the anchor UPF and a base station, moves and accesses the new base station and then performs communication with the session.

According to embodiments, a method by a first network entity for supporting a session continuity for a terminal in a wireless communication system comprises receiving, from a second network entity, a first message requesting an update of a protocol data unit (PDU) session for a terminal; determining whether an anchor user plane function (UPF) of the PDU session supports the terminal; selecting an intermediate UPF to update the PDU session, if the anchor UPF does not support the terminal; and establishing a session with the intermediate UPF.

According to an embodiment, the method may further comprise modifying the PDU session with the anchor UPF.

According to an embodiment, the method may further comprise transmitting, to the second network entity, a second message in response to the first message, and the second message may include at least one of an address of the intermediate UPF and a tunnel identifier.

According to an embodiment, in the method, the establishing may comprise transmitting, to the intermediate UPF, a message to request a session establishment; and receiving, from the intermediate UPF, a message to response the session establishment.

According to an embodiment, in the method, the intermediate UPF may be selected based on at least one of a location of the terminal, a load status of a UPF, a location of a UPF and a capacity of a UPF.

According to an embodiment, in the method, the first message may be received in a case of a handover for the terminal or a case of a service request by the terminal.

According to an embodiment, in the method, the first network entity may be a session management function (SMF) and the second network entity may be an access & mobility function (AMF).

According to embodiments, a first network entity for supporting a session continuity for a terminal in a wireless communication system comprises a transceiver and a controller coupled with the transceiver. The controller is configured to control to receive, from a second network entity, a first message requesting an update of a protocol data unit (PDU) session for a terminal, to determine whether an anchor user plane function (UPF) of the PDU session supports the terminal, to select an intermediate UPF to update the PDU session, if the anchor UPF does not support the terminal, and to establish a session with the intermediate UPF.

According to the present disclosure, it is possible to improve user QoE through a session continuity of a terminal in a distributed 5G network where a plurality of UPFs are deployed. Also, it is possible to reduce the operation and signaling complexity of a 5G core network because it is allowed to separately perform a handover procedure including a change in base station by a movement of a terminal and an anchor UPF relocation procedure for supporting an SSC mode of session.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A and 4B are diagrams illustrating an N2-based handover procedure including a procedure for adding an intermediate UPF when a terminal is out of a service area of an anchor UPF according to an embodiment;

FIG. 5 is a diagram illustrating a UE-triggered service request procedure including a procedure for adding an intermediate UPF when a terminal is out of a service area of an anchor UPF according to an embodiment;

FIGS. 11A and 11B are diagrams illustrating an N2-based handover procedure including a procedure for changing to a new SMF and anchor UPF when a terminal is out of a service area of an existing SMF and anchor UPF according to an embodiment;

FIGS. 12A and 12B are diagrams illustrating a new procedure for changing an anchor UPF of SSC Mode 2 session according to an embodiment;

DETAILED DESCRIPTION

Figure 1:
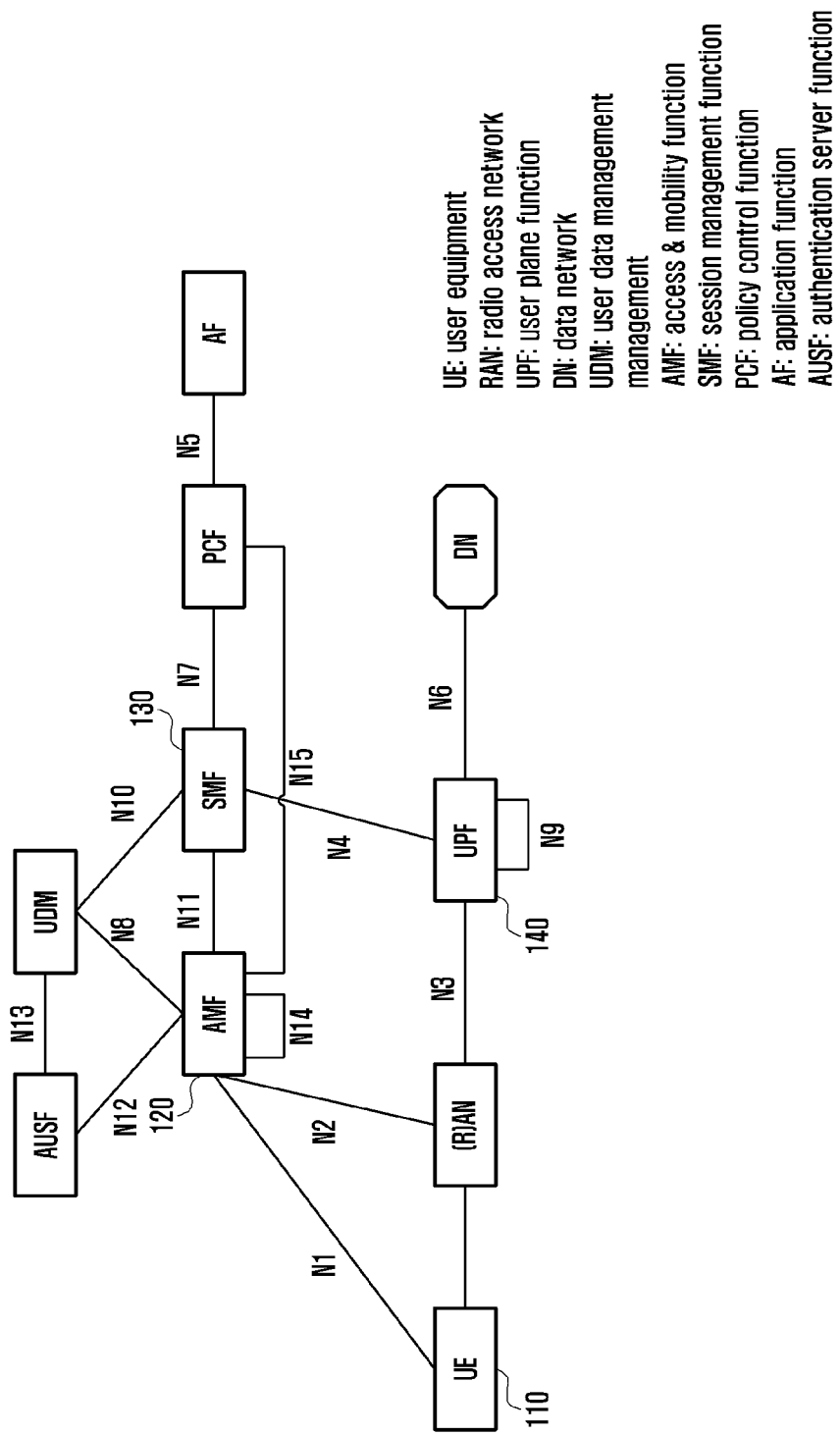
FIG. 1 is a diagram illustrating a network architecture and interface of a 5G cellular system.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device Hereinafter, embodiments of the present disclosure will be described in detail with reference to the accompanying drawings. In the following, the descriptions of techniques that are well known in the art and not directly related to the present disclosure are omitted. This is to clearly convey the subject matter of the present disclosure by omitting an unnecessary explanation. In addition, the terms used herein are defined in consideration of functionality and may be changed according to the intention of users, operators, or the like. Therefore, the definition should be based on the contents throughout this disclosure.

The advantages and features of the present disclosure and the manner of achieving them will become apparent with reference to embodiments described in detail below with reference to the accompanying drawings. The present disclosure may, however, be embodied in many different forms and should not be construed as limited to embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card. Also, in embodiments, the unit may include one or more processors.

In this disclosure, a base station (BS), which is an entity of performing resource allocation for a terminal, may be at least one of an eNode B, a Node B, a radio access network (RAN), an access network (AN), a radio access unit, a base station controller, or a node on a network. In addition, a terminal may include a user equipment (UE), a mobile station (MS), a cellular phone, a smart phone, a computer, or a multimedia system capable of performing a communication function. In this disclosure, a downlink (DL) refers to a radio transmission path of a signal from a base station to a terminal, and an uplink (UL) refers to a radio transmission path of a signal from a terminal to a base station. Although embodiments to be described hereinafter will use an LTE or LTE-A system, the embodiments may also be applied to other communication systems having a similar technical background or channel form. In addition, the embodiments may be applied to other communication systems through only minor modifications within the scope of the present disclosure as will be appreciated by a person skilled in the art.

According to embodiments of the present disclosure, when a base station is changed due to mobility of a terminal in a 5G cellular network, and when there is no connectivity between the base station and an anchor UPF responsible for a data path of a session set up by the terminal before moved, an SMF for controlling the session selects a new UPF to be inserted between the two network entities and establishes a data transmission path of the session including the new UPF to achieve the connectivity of the two network entities.

Specifically, the absence of connectivity between the two network entities may be defined as follows in terms of a service area of a network entity defined by an operator. That is, if the terminal moves to a base station included in a service area of a specific UPF, the connectivity between the UPF and the base station exists. However, if the terminal moves to a base station not included in the service area of the UPF, the connectivity between the UPF and the base station does not exist. This is applicable even when the UPF exists with the base station. In addition, even if the UPF can be physically connected to the base station through, e.g., the Internet, the case where the connection is restricted by a provider policy or a dynamic condition such as a load status of the anchor UPF may be regarded as the absence of connectivity. Also, as mentioned in a handover procedure of 3GPP TS 23.401 document that defines the evolved packet core (EPC) standard, the case where there is no IP connectivity between the two entities may be regarded as the absence of connectivity.

Figure 2:
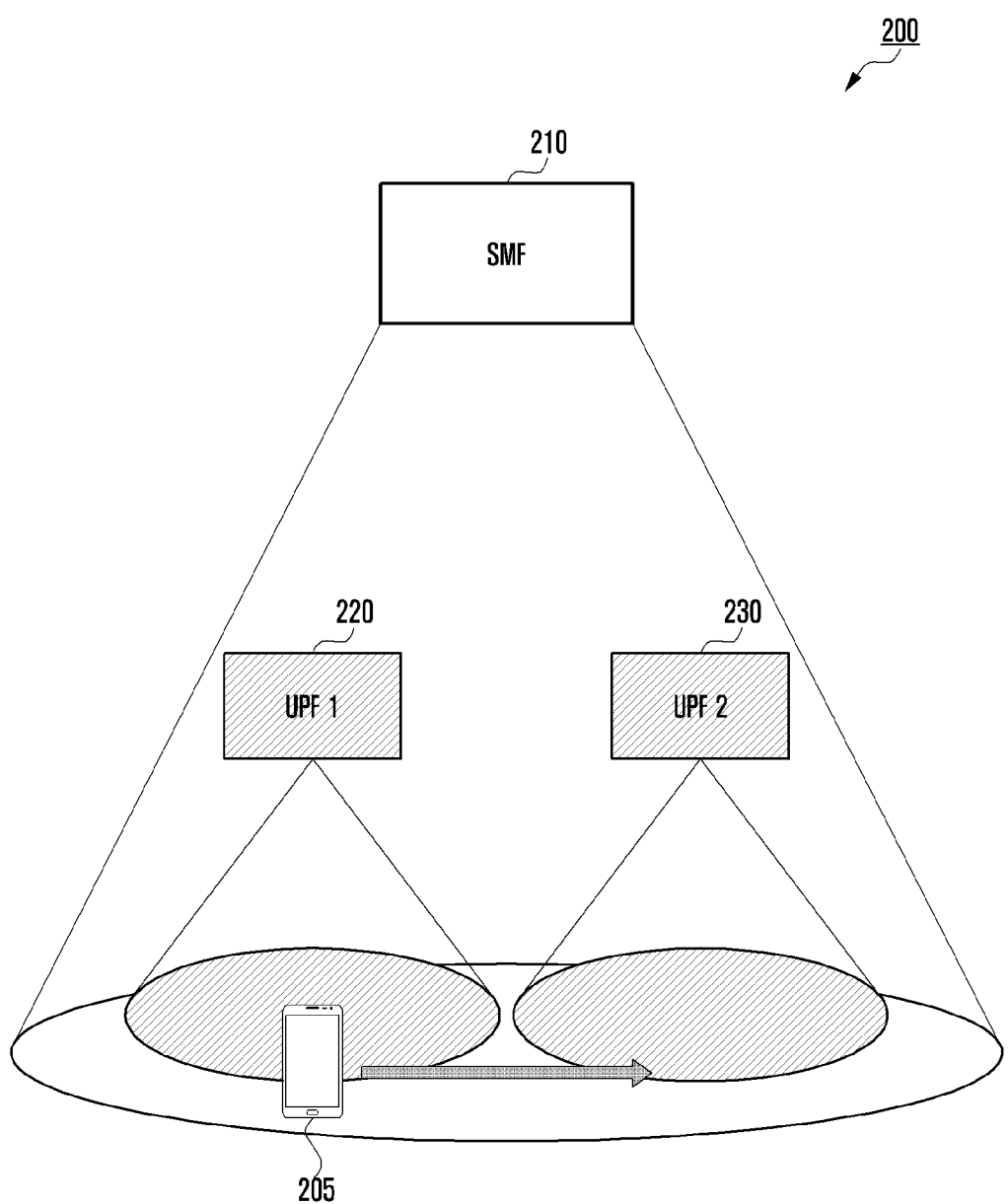
FIG. 2 is a diagram illustrating a scenario in which a terminal moves from a service area of UPF1 to a service area of UPF2 without a change in SMF.
Figure 3:
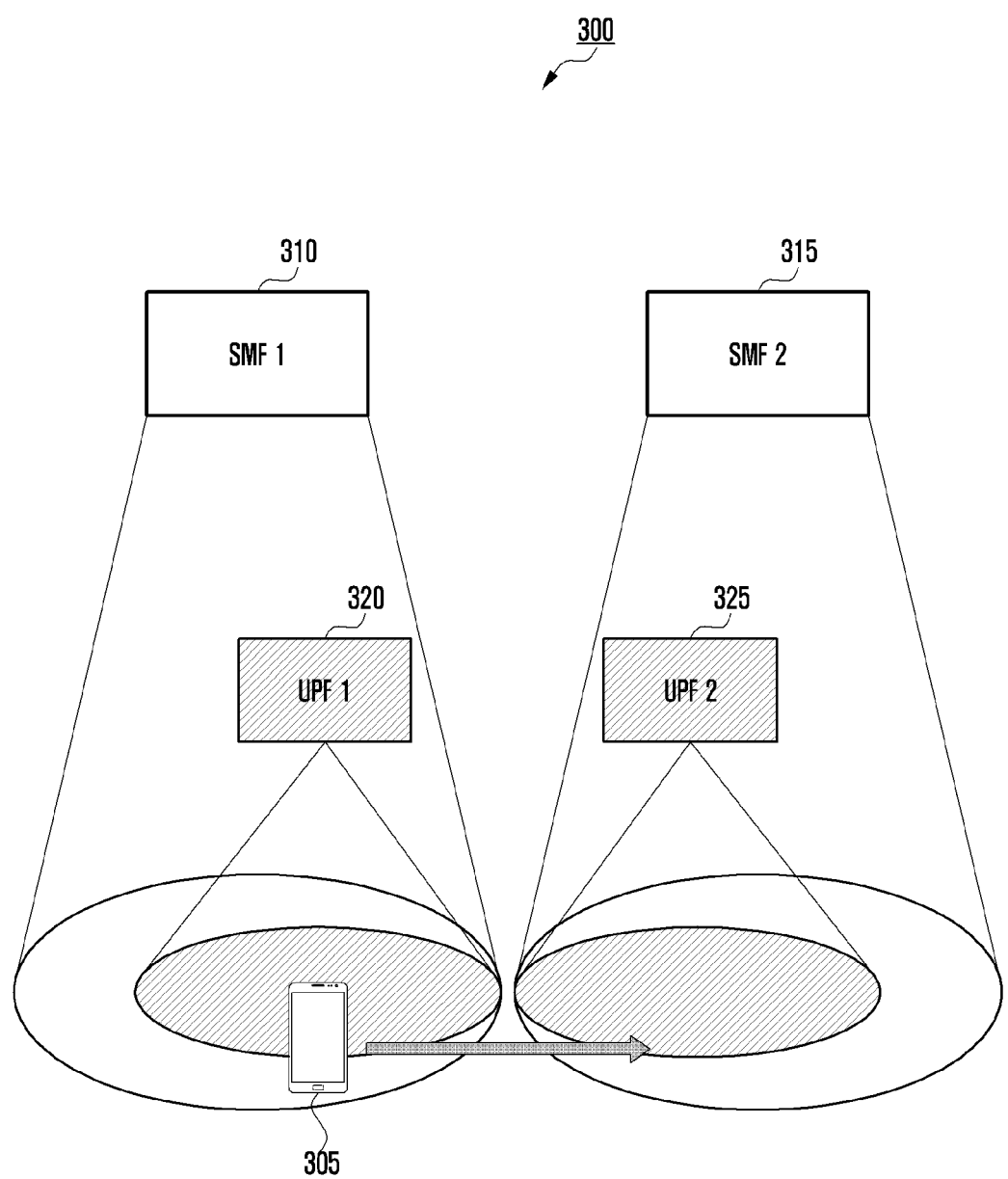
FIG. 3 is a diagram illustrating a scenario in which a terminal moves from a service area of UPF1 managed by SMF1 to a service area of UPF2 managed by SMF2.

In addition, cases where the terminal moves may be classified as follows. As shown in FIG. 2, a network may be configured such that a terminal 205 receives a service from the same SMF 210 even though the terminal 205 moves between different UPFs 220 and 230. In this case, the connectivity between the UPF1 220 and a target base station can be achieved through the UPF2 230. On the other hand, as shown in FIG. 3, a network may be configured such that, when a terminal 305 moves between different UPFs 320 and 325, SMFs 310 and 315 are also changed. In this case, an SMF relocation procedure may be additionally performed together with a UPF relocation procedure.

Now, various embodiments of the present disclosure will be described in detail.

Figure 4B:
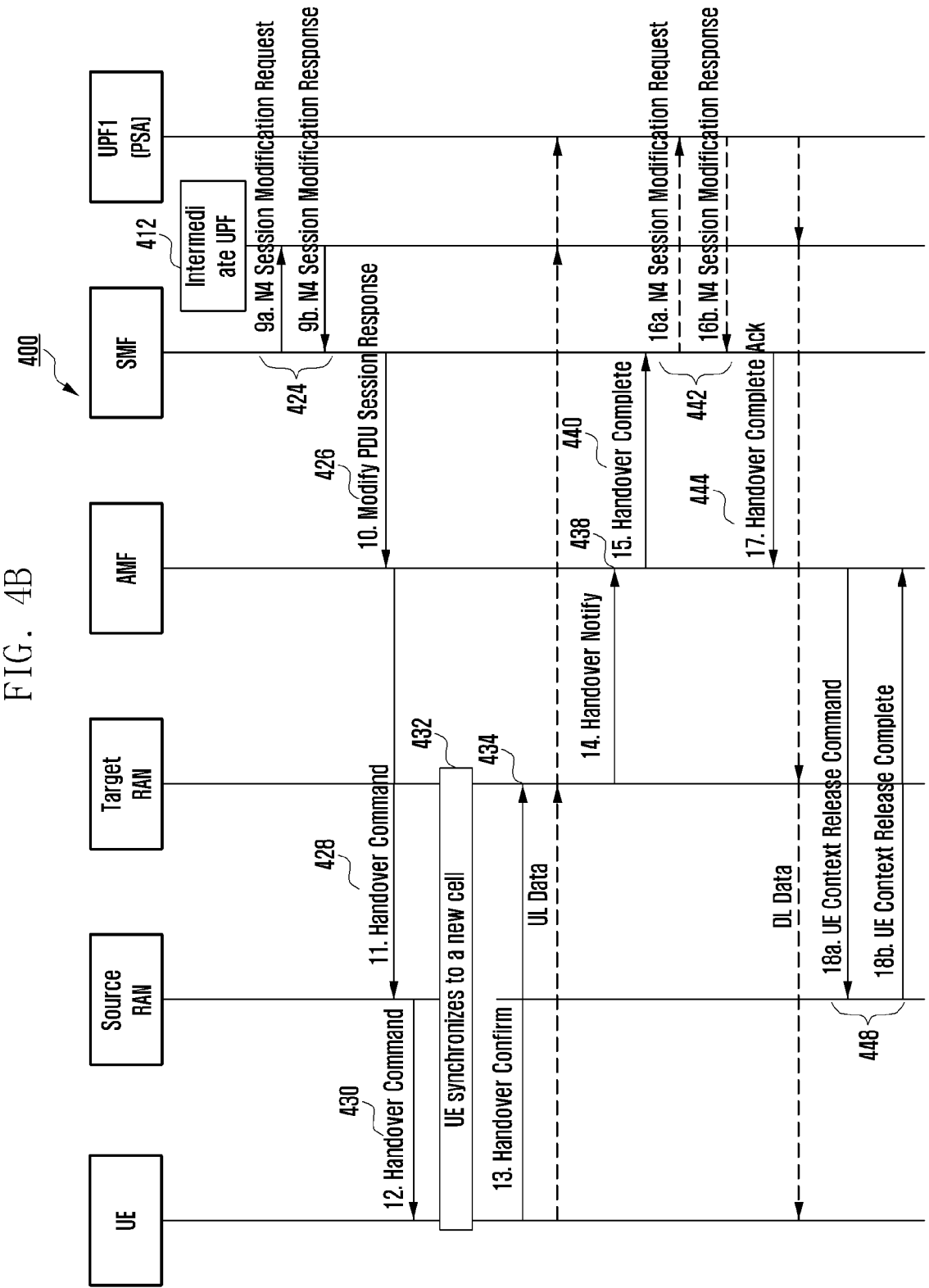

One embodiment relates to an N2-based handover procedure including a process of adding an intermediate UPF to achieve a session continuity when a terminal in a CM-connected state performs handover. This can be applied to the case where there is no relocation of SMF due to mobility of the terminal as shown in FIG. 2. Referring to FIGS. 4A and 4B, at the outset (402), the terminal (hereinafter, referred to as UE) which maintains a NAS signaling connection with an AMF of the 5G core network in the CM-connected state may be in a state of setting up at least one session with at least one anchor UPF. When the UE in the CM-connected state moves to a base station (i.e., a target RAN) having no connectivity with the anchor UPF, a handover procedure proposed in this disclosure may be performed. At step 1 (404, 406), a source base station (i.e., a source RAN) selects the target RAN suitable for handover of the UE, based on UE feedback (e.g., a measurement report), and transmits, to the AMF, a handover request message including identification information (e.g., RAN ID or Cell ID) of the target RAN and identification information (e.g., PDU session ID(s)) of a PDU session being currently used by the UE.

Here, the PDU session being used refers to a session state in which a user plane (UP) data transmission path has been already set up between the UE and the anchor UPF and thus a UL or DL data packet can be transmitted. At step 2 (408), the AMF may deliver the PDU session handover request message to the SMF that controls the PDU session being used by the UE. At this time, if two or more PDU sessions are controlled by different SMFs, the AMF may generate a plurality of PDU session handover request messages and send them to the respective SMFs. If the SMF that receives the PDU session handover request message determines that there is no connectivity between the target RAN and the anchor UPF, the SMF may select an intermediate UPF 412 for establishing connectivity between the target RAN and the anchor UPF at step 3 (410). The intermediate UPF may be selected from UPFs having connectivity with both the target RAN and the anchor UPF. This selection may be preformed based on various parameters, such as a UE location, a load status of a UPF, a location of a UPF, and a capacity of a UPF, that can be considered by the SMF.

After selecting the intermediate UPF, in order to update the data transmission path for the PDU session, the SMF may perform an N4 session establishment procedure with the intermediate UPF at step 4 (414), and also perform an N4 session modification procedure with the anchor UPF at step 5 (416). The N4 session establishment procedure may include a process in which the SMF transmits, to the intermediate UPF, an N4 session establishment request signaling including an identification address of the target RAN, an identification address of the anchor UPF, and tunnel identification information used for N9 tunnel setup, and a process in which the intermediate UPF transmits, to the SMF, an N4 session establishment response signaling including an identification address of the intermediate UPF and tunnel identification information, which are used for N9 tunnel setup with the anchor UPF, and an identification address of the intermediate UPF and tunnel identification information, which are used for N3 tunnel setup with the target RAN.

Thereafter, the SMF may provide the anchor UPF with information for the N9 tunnel setup with the intermediate UPF (e.g., an identification address of the intermediate UPF and tunnel identification information) through the N4 session modification procedure. Then, at step 6 (418), the SMF may transmit, to the AMF, a PDU session handover response message including the PDU session identification information and CN tunnel information for the N3 tunnel setup with the target RAN at the intermediate UPF. At step 7a (420), the AMF transmits, to the target RAN, a handover request message including the PDU session handover response message received from the SMF. If a plurality of PDU session handover response messages are generated, the AMF may wait for a specific time to collect all the PDU session handover response messages and then deliver all the collected messages to the target RAN at a time. Upon receiving the handover request message, the target RAN allocates a resource for the N3 tunnel setup with the intermediate UPF with respect to a PDU session allowed by the target RAN. Then, at step 7b (420), the target RAN transmits, to the AMF, a handover request ACK message including RAN tunnel information of the session (e.g., an identification address of the target RAN and tunnel identification information) together with identification information of the session (e.g. PDU session ID). The handover request ACK message may further include session identification information and a cause indicator with respect to a PDU session disallowed by the target RAN.

Upon receiving the handover request ACK message, the AMF generates and transmits, using the identification information of a PDU session at step 8 (422), a modify PDU session request message to the SMF that controls the PDU session. At this time, the modify PDU session request message may include different information, depending on whether the target RAN allows or not a session. In case of a session allowed by the target RAN, the RAN tunnel information set up for the N3 tunnel by the target RAN may be included. In this case, the SMF may provide the RAN tunnel information to the intermediate UPF at step 9 (424) to complete the N3 tunnel setup. In case of a session disallowed by the target RAN, the SMF may request the intermediate UPF to release the N3 and N9 tunnel resources set up at step 4 above. At this time, for the session disallowed by the target RAN, the SMF may further perform a PDU session release procedure.

Thereafter, at step 10 (426), the SMF may transmit a modify PDU session response message to the AMF. Then, at step 11 (428), the AMF may transmit a handover command message to the source RAN. The handover command message may distinctively include session identification information allowed by the target RAN and session identification information disallowed. If the source RAN decides to perform handover to the target RAN, the handover command message is sent to the UE at step 12 (430). Then, at step 13 (432 and 434), the UE performs synchronization with the target RAN and transmits a handover confirm message to the target RAN.

Thereafter, at step 14 (438), the target RAN transmits a handover notify message to the AMF. Then, at step 15 (440), the AMF transmits a handover complete message to the SMF corresponding to each PDU session being used by the UE. Therefore, the SMF can know that the handover has been successfully performed, and may further perform the N4 session modification procedure with the anchor UPF for the purpose of path optimization and the like at step 16 (442). Thereafter, at step 17 (444), the SMF may transmit an ACK for the handover complete message to the AMF. Then, at step 18a (448), the AMF may transmit a UE context release command message to the source RAN in order to release UE context at the source RAN. At step 18b (448), the source RAN releases all the UE contexts and then transmits a UE context release complete message to the AMF.

In this embodiment, if the source RAN belongs to the allowed area defined by the 5GC, and if the target RAN belongs to the non-allowed area, a procedure for handover of the UE from the allowed area to the non-allowed area may be included. In this case, the AMF may omit PDU session-related signaling such as the above-described steps 2 to 6 and 8 to 10. In addition, through the above step 7, the AMF may provide information that the target RAN belongs to the non-allowed area of the UE. Also, the AMF may insert, into the handover command message of the above step 11, an indication of failure or deactivation of the PDU session setup due to movement to the non-allowed area. Thereafter, when the UE successfully performs handover to the target RAN, the AMF may add signaling for deactivating the already set up PDU session to the handover complete message through the above step 15. In addition, in order to inform the SMF about the cause, this message may include information that the UE has moved to the non-allowed area. The SMF that receives the above message may further remove the RAN identification information and tunnel information for the N3 tunnel setup from the anchor UPF of the corresponding session through the above step 16.

The names of various signaling messages used in this embodiment may be changed.

Another embodiment relates to a service request procedure including a process of adding an intermediate UPF to achieve a session continuity when a terminal in a CM-idle state as well as the CM-connected state performs a service request. This can be applied to the case where there is no relocation of SMF due to mobility of the terminal as shown in FIG. 2. Referring to FIG. 5, if uplink data traffic occurs in the terminal (i.e., UE) and thus there is a need to set up a UP path of a specific PDU session, the UE transmits a service request message together with identification information (e.g., PDU session ID) of the corresponding PDU session through NAS signaling at step 1 (502). The NAS signaling is delivered to the AMF via the RAN. At step 2 (504), the RAN may deliver its own location information and identification information as an N2 message together with the NAS signaling. The AMF that receives the N2 message may perform, at step 3 (506) if necessary, an authentication and security procedure with the UE that sent the NAS signaling.

Thereafter, at step 4 (508), using PDU session identification information included in the service request message, the AMF transmits an N11 message for activating the UP transmission path of the PDU session to the SMF that manages the corresponding PDU session. Here, the activation refers to reestablishment of a released UP transmission path, namely, a resource allocation for tunnel setup and an exchange of such information. The SMF that receives the N11 message determines whether connectivity with the anchor UPF of the corresponding PDU session is valid, based on identification information and location information of the RAN currently accessed by the UE. If it is determined that there is no connectivity between the RAN and the anchor UPF, the SMF may select an intermediate UPF 512 for establishing connectivity between the RAN and the anchor UPF at step 5 (510). The intermediate UPF may be selected from UPFs having connectivity with both the RAN and the anchor UPF. This selection may be preformed based on various parameters, such as a UE location, a load status of a UPF, a location of a UPF, and a capacity of a UPF, that can be considered by the SMF.

After selecting the intermediate UPF, in order to update the UP transmission path for the PDU session, the SMF may perform an N4 session establishment procedure with the intermediate UPF at step 6 (514), and also perform an N4 session modification procedure with the anchor UPF at step 7 (516). The N4 session establishment procedure may include a process in which the SMF transmits, to the intermediate UPF, an N4 session establishment request signaling including an identification address of the anchor UPF and tunnel identification information used for N9 tunnel setup, and a process in which the intermediate UPF transmits, to the SMF, an N4 session establishment response signaling including an identification address of the intermediate UPF and tunnel identification information, which are used for N9 tunnel setup with the anchor UPF. Then, the SMF may provide the anchor UPF with information for the N9 tunnel setup with the intermediate UPF (e.g., an identification address of the intermediate UPF and tunnel identification information) through the N4 session modification procedure.

Thereafter, at step 8 (518), the SMF may transmit, to the AMF, the N11 message including PDU session identification information and CN tunnel information for the N3 tunnel setup with the RAN at the intermediate UPF. Then, at step 9 (520), the AMF may transmit, to the RAN, an N2 request message including the PDU session identification information and the CN tunnel information received through the N11 message. At this time, the AMF may also transmit a NAS message called a service accept. Then, the RAN allocates a resource for the N3 tunnel setup of the corresponding session and delivers the NAS message to the UE. At the same time, the RAN and the UE may perform RRC connection reconfiguration at step 10 (522) to set up a data radio bearer (DRB) that complies with a QoS rule of the session. After the completion of DRB setup, the UE may send uplink data 524 to the RAN.

At step 11 (526), the RAN may transmit, to the AMF, an N2 request ACK message including RAN tunnel identification information allocated for the N3 tunnel. Then, at step 12 (528), the AMF transmits, to the SMF, an SM request message including the RAN tunnel information for the N3 tunnel setup received through the N2 request ACK message. Thereafter, at step 13 (530), the SMF may perform an N4 session modification procedure to transmit the RAN tunnel information to the intermediate UPF. Then, at step 14 (532), the SMF may transmit an ACK for the SM request message of the step 12 to the AMF. Similarly, the names of various signaling messages used in this embodiment may be changed.

Another embodiment relates to an N2-based handover procedure including a process of changing an anchor UPF to support SSC modes 2/3 when a UE in a CM-connected state performs a handover. This can be applied to the case where there is no relocation of SMF due to mobility of the terminal as shown in FIG. 2. In this embodiment, the same as previously described will be omitted.

Figure 6A:
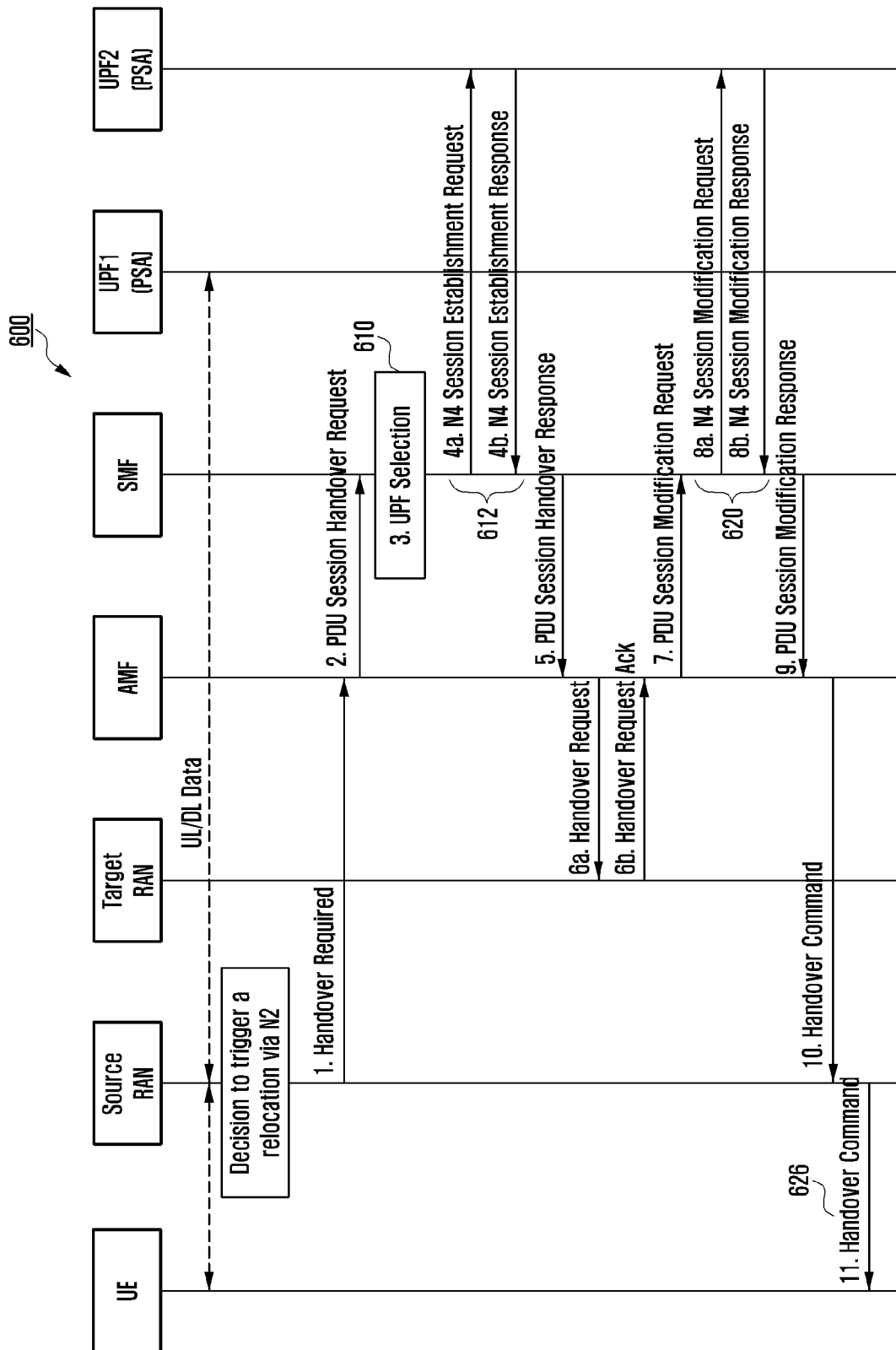
FIGS. 6A and 6B are diagrams illustrating an N2-based handover procedure including a procedure for changing an anchor UPF when a terminal is out of a service area of the anchor UPF according to an embodiment.
Figure 6B:
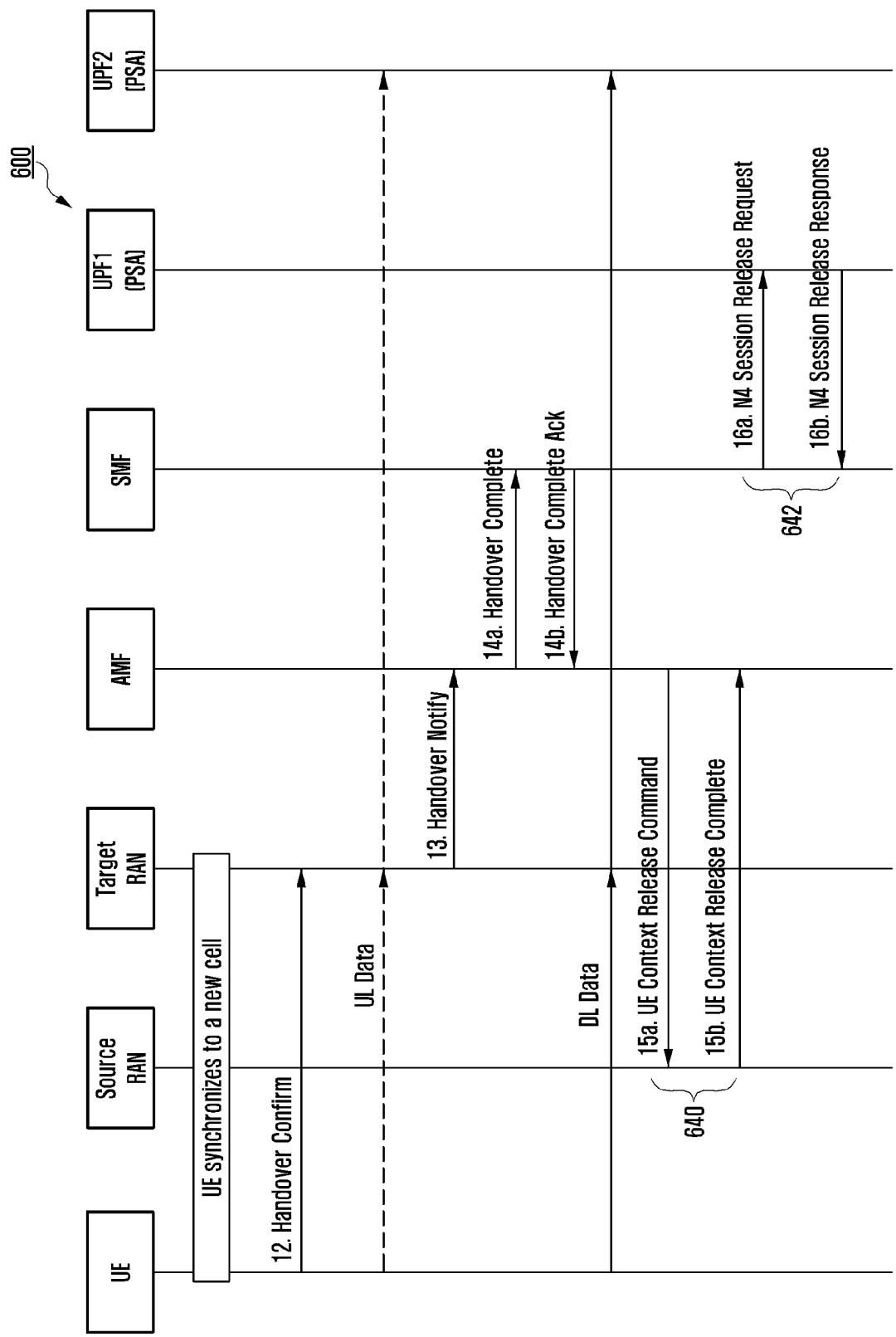

Referring to FIGS. 6A and 6B, with respect to a PDU session set to SSC mode 2 or 3, if it is determined that there is no connectivity between the target RAN and UPF1 which is an existing anchor UPF of the session, the SMF may newly select an anchor UPF (i.e., UPF2) at step 3 (610). In this case, the selection of new anchor UPF may be performed, based on UPF information accessible by the SMF, especially, considering a UE location, a location and load status of a UPF, supportable session information (e.g., DNN, PDU type, SSC mode), and an operator policy. The SMF performs an N4 session establishment procedure with the UPF2 such that the UPF2 sets up a rate enforcement, packet detection, and reporting rule for the corresponding PDU session. Also, the SMF may receive CN tunnel information, etc. set up for N3 tunnel of the corresponding PDU session from the UPF2. At this time, if it is necessary to change an IP address of the corresponding PDU session, the SMF may allocate a new IP address at step 4 (612).

Thereafter, at step 8 (620), the SMF may provide RAN tunnel information allocated for the N3 tunnel setup by the target RAN with respect to a session allowed by the target RAN, and release the CN tunnel information allocated to the UPF2 with respect to a disallowed session. At this time, the SMF may further perform a PDU session release procedure for the session disallowed by the target RAN. Thereafter, when sending a handover command message to the UE at step 11 (626), the IP address allocated for each PDU session by the SMF at the above step 4 may be included. Thereafter, if the handover is successfully performed to the target RAN, the AMF performs a UE context release procedure to the source RAN at step 15 (640), and the SMF performs, at step 16 (642), an N4 session release procedure with the UPF1 which is the existing anchor UPF.

Figure 7:
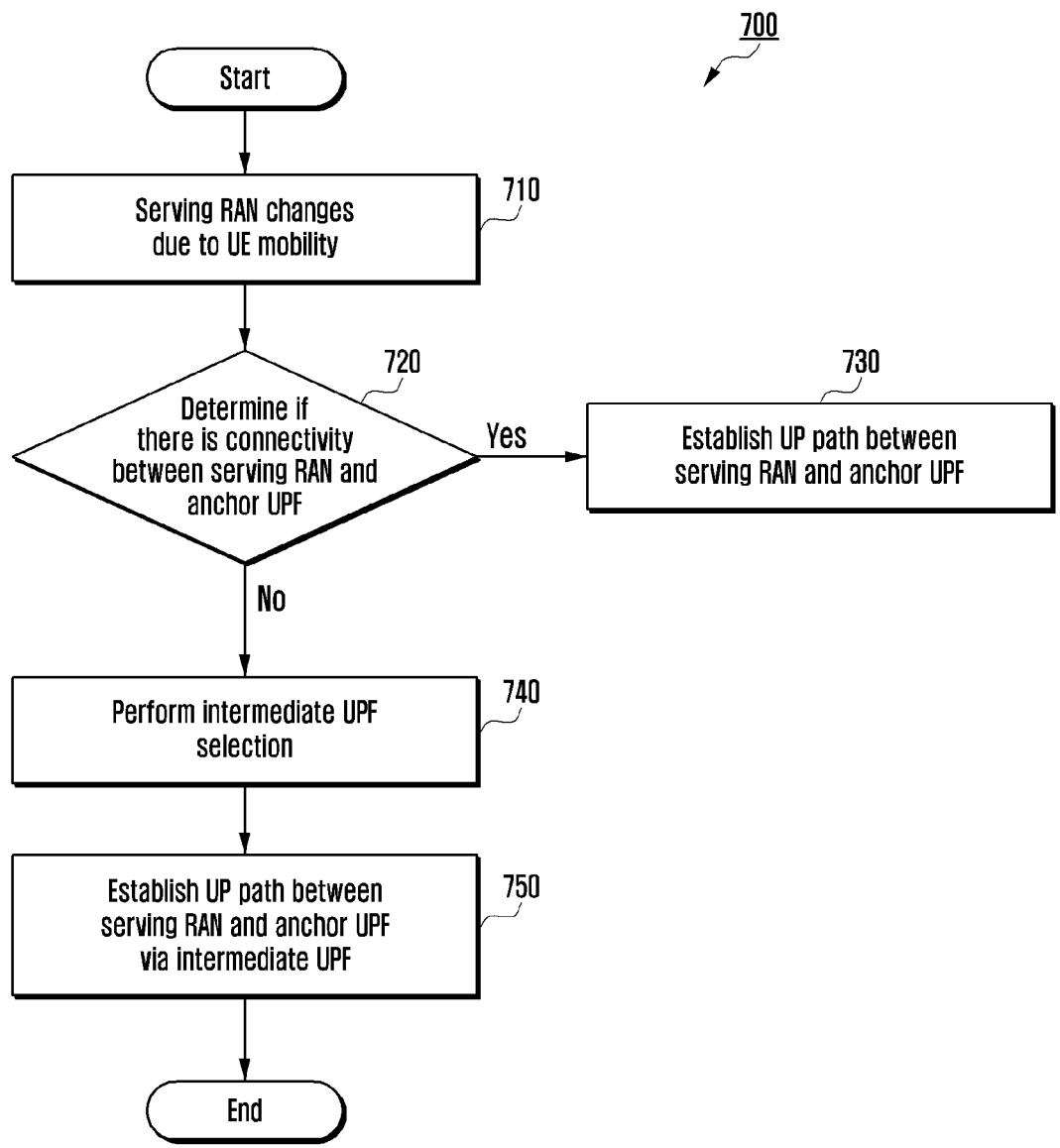
FIG. 7 is a diagram illustrating an internal operation of an SMF when a base station accessed by a terminal is changed according to an embodiment is changed.

Another embodiment relates to an internal operation of the SMF. Referring to FIG. 7, at step 710, the SMF may be notified by the AMF that the RAN accessed by the UE is changed due to mobility of the UE. Here, the change of the RAN may include changes in identification information of the RAN, location information of the UE, a registration area of the UE, and the like. At step 720, for each PDU session set up by the UE, the SMF determines whether the changed RAN has connectivity with the anchor UPF of the PDU session. Also, the connectivity may be determined depending on whether the location of the RAN is within a service area of the anchor UPF. If the connectivity is valid, the SMF may perform a procedure for establishing a UP data transmission path between the RAN and the anchor UPF at step 730. However, if the connectivity is not valid, the SMF may select an intermediate UPF at step 740 and establish an UP data transmission path between the RAN and the anchor UPF via the intermediate UPF at step 750.

Figure 8A:
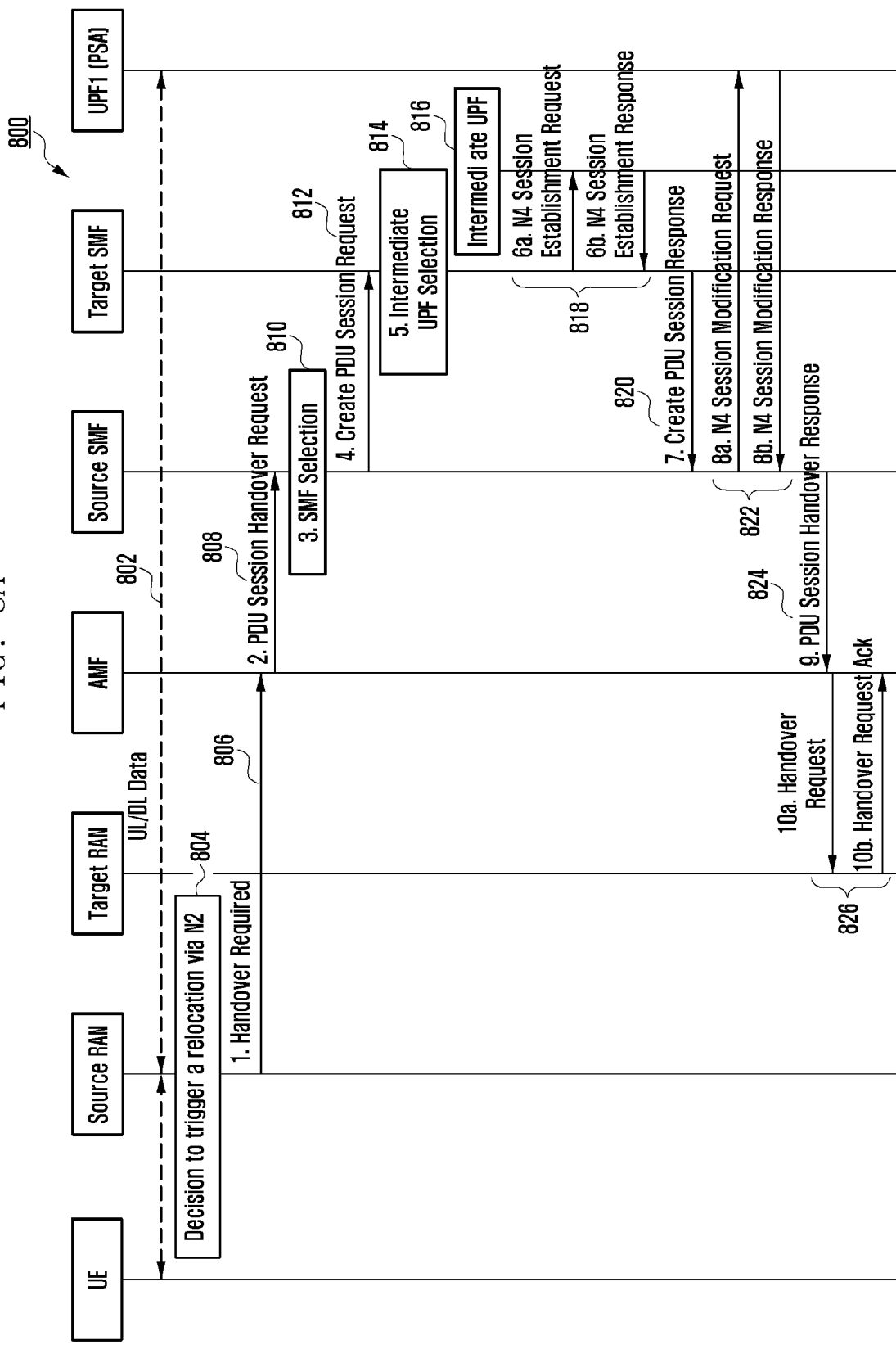
FIGS. 8A and 8B are diagrams illustrating an N2-based handover procedure including a process of adding an intermediate UPF to achieve a session continuity according to an embodiment.
Figure 8B:
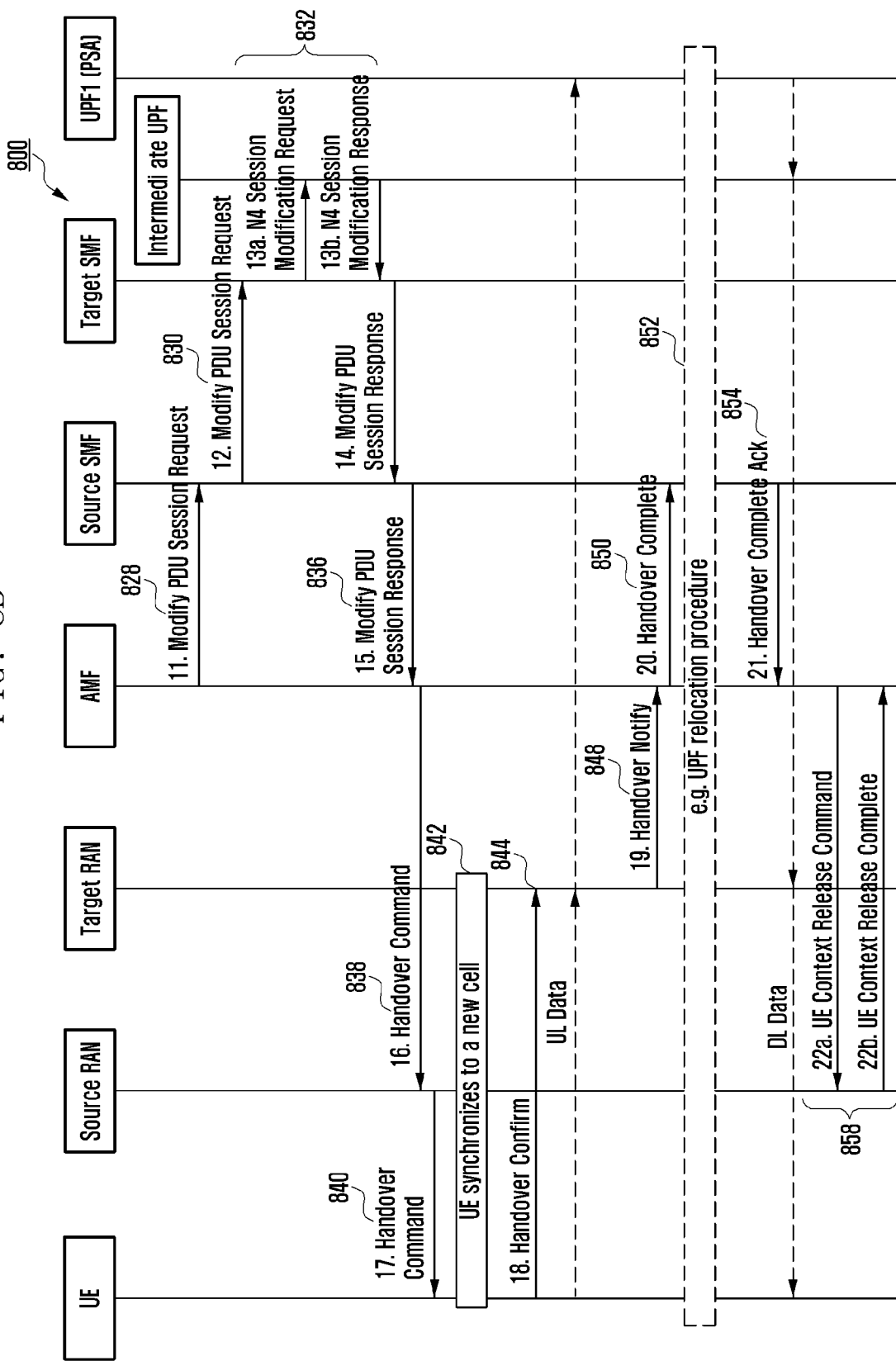

Another embodiment relates to an N2-based handover procedure including a process of adding an intermediate UPF to achieve a session continuity when a terminal in the CM-connected state performs handover. This can be applied to the case where there is a need for relocation of SMF due to mobility of the terminal as shown in FIG. 3. Referring to FIGS. 8A and 8B, at the outset (802), the terminal (i.e., UE) which maintains a NAS signaling connection with an AMF of the 5G core network in the CM-connected state may be in a state of establishing at least one session with at least one anchor UPF. When the UE in the CM-connected state moves to a base station (i.e., a target RAN) having no connectivity with the anchor UPF, a handover procedure proposed in this disclosure may be performed.

At step 1 (804, 806), a source base station (i.e., a source RAN) selects the target RAN suitable for handover of the UE, based on UE feedback (e.g., a measurement report), and transmits, to the AMF, a handover request message including identification information (e.g., RAN ID or Cell ID) of the target RAN and identification information (e.g., PDU session ID(s)) of a PDU session being currently used by the UE. Here, the PDU session being used refers to a session state in which a user plane (UP) data transmission path has been already established between the UE and the anchor UPF and thus a UL or DL data packet can be transmitted. At step 2 (808), the AMF may deliver the PDU session handover request message to a source SMF that controls the PDU session being used by the UE.

If the source SMF that receives the PDU session handover request message determines that the target RAN has no connectivity with UPFs managed by the source SMF, the source SMF may perform a procedure for selecting a new SMF at step 3 (810). Here, the absence of the connectivity may include a deviation from service areas of the UPFs managed by the source SMF. In this case, a new SMF that manages a service area including the target RAN may be selected. Also, a service area of the SMF may be defined as a union of service areas of UPFs that can be controlled by the SMF. The selection of the new SMF may be performed by the source SMF if there is an interface between SMFs, or otherwise by the AMF. If the newly selected SMF is called a target SMF, the source SMF may transmit a create PDU session request message to the target SMF at step 4 (812). The create PDU session request message may include at least one of PDU session identification information, UE location information, subscriber identification information, target RAN identification information, source SMF identification information, anchor UPF identification information, CN tunnel information for N3 tunnel, and session related context (DNN, S-NSSAI, PDU type, SSC mode, IP address, etc.).

The target SMF that receives the create PDU session request selects an intermediate UPF to provide connectivity between the anchor UPF and the target RAN at step 5 (814). The intermediate UPF 816 may be selected from UPFs having connectivity with both the target RAN and the anchor UPF. This selection may be preformed based on various parameters, such as a UE location, a load status of a UPF, a location of a UPF, and a capacity of a UPF, that can be considered by the target SMF. After selecting the intermediate UPF, in order to update the data transmission path for the PDU session, the target SMF may perform an N4 session establishment procedure with the intermediate UPF at step 6 (818). The N4 session establishment procedure may include a process in which the SMF transmits, to the intermediate UPF, an N4 session establishment request signaling including an identification address of the target RAN, an identification address of the anchor UPF, and tunnel identification information used for N9 tunnel setup, and a process in which the intermediate UPF transmits, to the SMF, an N4 session establishment response signaling including an identification address of the intermediate UPF and tunnel identification information, which are used for N9 tunnel setup with the anchor UPF, and an identification address of the intermediate UPF and tunnel identification information, which are used for N3 tunnel setup with the target RAN.

Thereafter, in response to the create PDU session request, the target SMF may transmit a create PDU session response message to the source SMF at step 7 (820). This response message may include at least one of PDU session identification information, subscriber identification information, target SMF identification information, intermediate UPF identification information, CN tunnel information for N9 tunnel setup, and session related context (DNN, S-NSSAI, PDU type, SSC mode, and the like). The source SMF that receives the response message may perform an N4 session modification procedure with the anchor UPF at step 8 (822). Through the N4 session modification procedure, the source SMF may provide the anchor UPF with relevant information (e.g., an identification address of the intermediate UPF, tunnel identification information) for the N9 tunnel setup with the intermediate UPF.

Thereafter, at step 9 (824), the source SMF may transmit, to the AMF, a PDU session handover response message including the PDU session identification information and CN tunnel information for the N3 tunnel setup with the target RAN at the intermediate UPF. At step 10a (826), the AMF transmits, to the target RAN, a handover request message including the PDU session handover response message received from the source SMF. Upon receiving the handover request message, the target RAN allocates a resource for the N3 tunnel setup with the intermediate UPF with respect to a PDU session allowed by the target RAN. Then, at step 10b (826), the target RAN transmits, to the AMF, a handover request ACK message including RAN tunnel information of the session (e.g., an identification address of the target RAN and tunnel identification information) together with identification information of the session (e.g. PDU session ID). The handover request ACK message may further include session identification information and a cause indicator with respect to a PDU session disallowed by the target RAN.

Upon receiving the handover request ACK message, the AMF generates and transmits, using the identification information of a PDU session at step 11 (828), a modify PDU session request message to the source SMF that controls the PDU session. At this time, the modify PDU session request message may include different information, depending on whether the target RAN allows or not a session. In case of a session allowed by the target RAN, the RAN tunnel information set up for the N3 tunnel by the target RAN may be included. In this case, the source SMF may transmit the modify PDU session request message to the target SMF at step 12 (830). Through this message, the target SMF may complete the N3 tunnel setup by providing the RAN tunnel information to the intermediate UPF at step 13 (832). In case of a session disallowed by the target RAN, the source SMF may transmit a release PDU session request message to the target SMF. Through this message, the target SMF may request the intermediate UPF to release the N3 and N9 tunnel resources set up at the above step 6. At this time, for the session disallowed by the target RAN, the source SMF may further perform a PDU session release procedure.

Thereafter, at step 15 (836), the source SMF may transmit a modify PDU session response message to the AMF. Then, at step 16 (838), the AMF may transmit a handover command message to the source RAN. If the source RAN decides to perform handover to the target RAN, the handover command message is sent to the UE at step 17 (840). Then, at step 18 (842, 844), the UE performs synchronization with the target RAN and transmits a handover confirm message to the target RAN. Thereafter, at step 19 (848), the target RAN transmits a handover notify message to the AMF.

Then, at step 20 (850), the AMF transmits a handover complete message to the SMF corresponding to each PDU session being used by the UE. Therefore, the SMF can know that the handover has been successfully performed, and may further perform an anchor UPF relocation procedure 852 with the anchor UPF for the purpose of path optimization and the like. Thereafter, at step 21 (854), the source SMF may transmit an ACK for the handover complete message to the AMF. Then, at step 22a (858), the AMF may transmit a UE context release command message to the source RAN in order to release UE context at the source RAN. At step 22b (858), the source RAN releases all the UE contexts and then transmits a UE context release complete message to the AMF.

The names of various signaling messages used in this embodiment may be changed.

Figure 9:
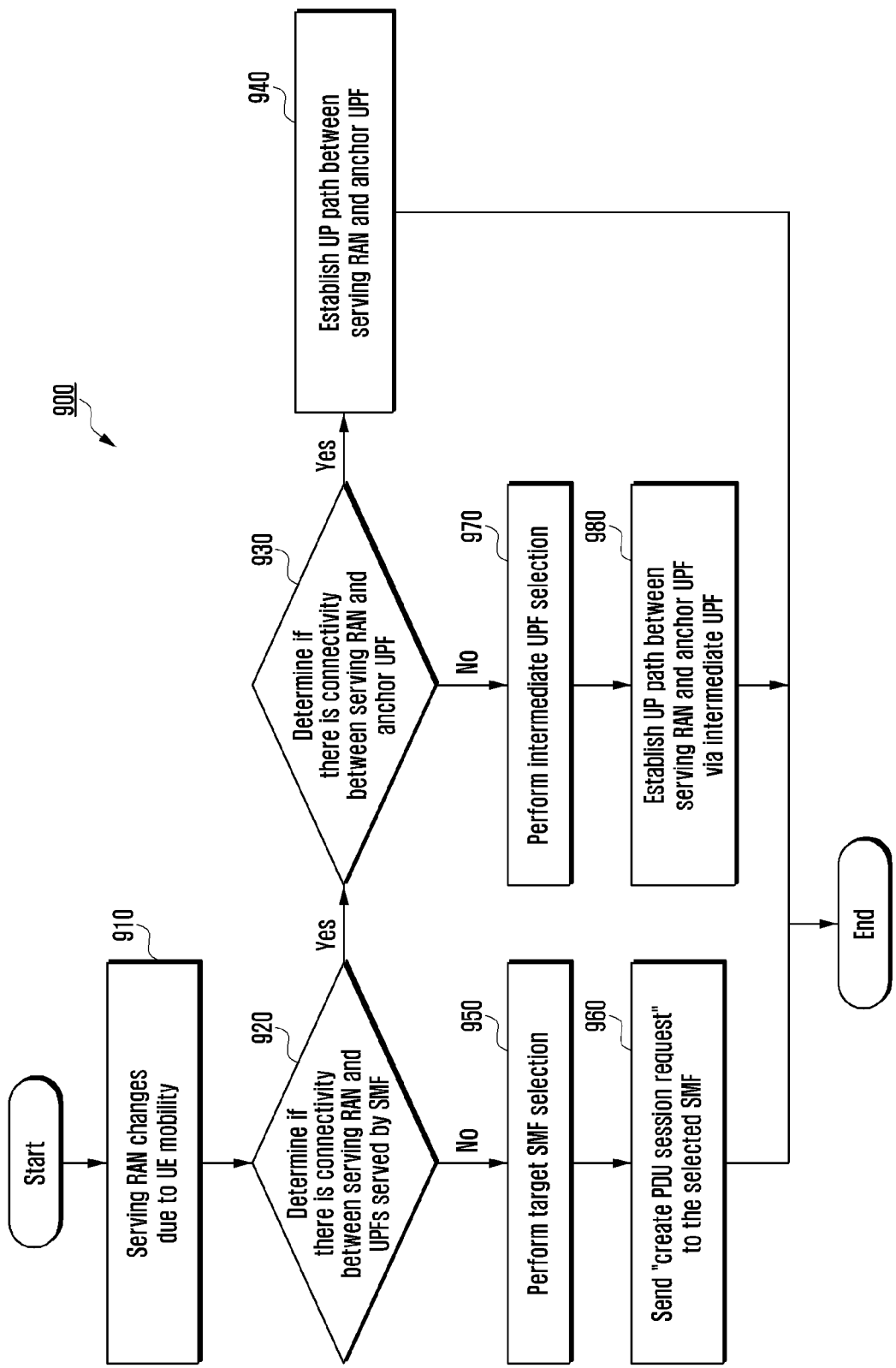
FIG. 9 is a diagram illustrating an internal operation of a source SMF according to an embodiment.

Another embodiment relates to an internal operation of the source SMF. Referring to FIG. 9, at step 910, the source SMF may be notified by the AMF that the RAN accessed by the UE is changed due to mobility of the UE. Here, the change of the RAN may include changes in identification information of the RAN, location information of the UE, a registration area of the UE, and the like. At step 920, for each PDU session set up by the UE, the source SMF determines whether the changed RAN has connectivity with UPFs being currently managed by the source SMF. Also, the connectivity may be determined depending on whether the location of the RAN is within service areas of the UPFs controlled by the source SMF.

If there is the connectivity, the source SMF may determine at step 930 whether there is connectivity between the RAN and the anchor UPF of the session. If a direct connection is possible, the source SMF may perform a procedure for establishing a UP data transmission path between the RAN and the anchor UPF at step 940. However, if the connectivity between the RAN and the UPFs controlled by the source SMF is not valid, the source SMF may perform a procedure of selecting a new SMF, i.e., a target SMF, at step 950. Then, at step 960, the source SMF may transmit a create PDU session request message to the selected target SMF. If the connectivity between the RAN and the anchor UPF is not valid, the source SMF may select an intermediate UPF at step 970 and establish an UP data transmission path between the RAN and the anchor UPF via the intermediate UPF at step 980.

Figure 10:
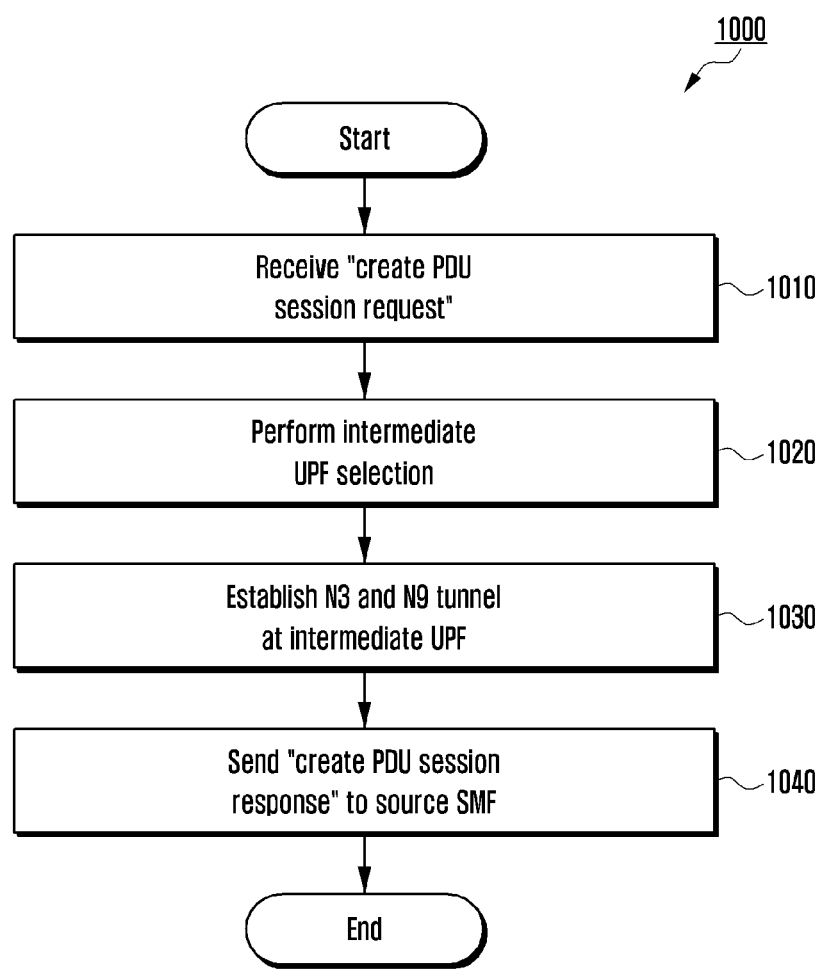
FIG. 10 is a diagram illustrating an internal operation of a target SMF according to an embodiment.

Another embodiment relates to an internal operation of the Target SMF. Referring to FIG. 10, the target SMF may receive a create PDU session request message from the source SMF at step 1010. This message may include source SMF identification information, session identification information, target RAN identification information, anchor UPF identification information, and CN tunnel information. The target SMF may select an intermediate UPF from this information at step 1020, allocate a resource for the N3 tunnel setup with the target RAN, and allocate a resource for the N9 tunnel setup with the anchor UPF at step 1030. Then, at step 1040, the target SMF may transmit a create PDU session response message to the source SMF. This message may include at least one of PDU session identification information, target SMF identification information, intermediate UPF identification information, CN tunnel information for N3 and N9 tunnel setup, and session related context (DNN, S-NSSAI, PDU type, SSC mode, and the like).

Figure 11A:
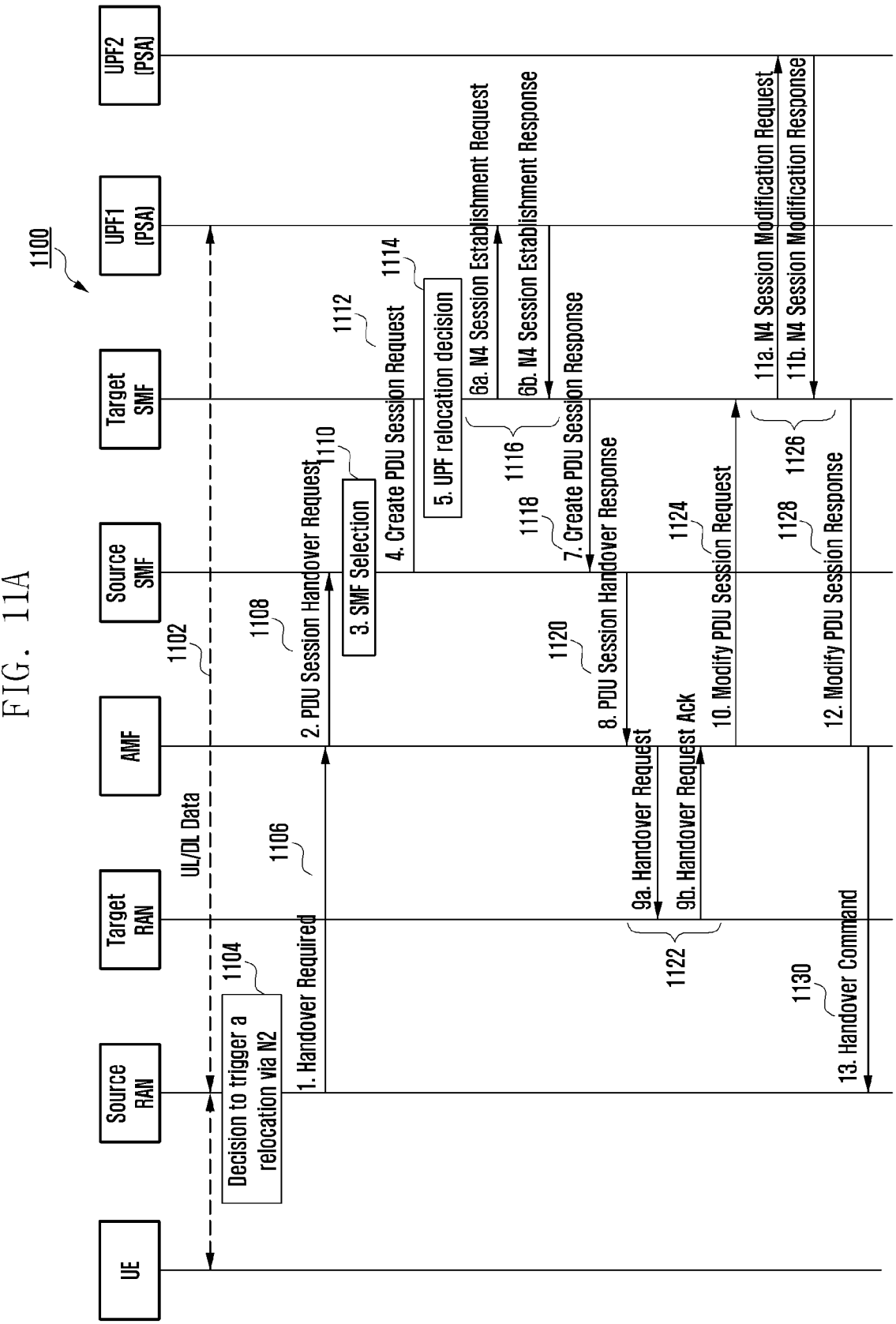

Another embodiment relates to an N2-based handover procedure including a procedure of changing to a new SMF and anchor UPF when the UE that performs handover in the CM-connected state is out of a current SMF and anchor UPF. This can be applied to the case where there is a need for relocation of SMF due to mobility of the terminal as shown in FIG. 3. Referring to FIGS. 11A and 11B, at the outset (1102), the UE which maintains a NAS signaling connection with an AMF of the 5G core network in the CM-connected state may be in a state of establishing at least one session with at least one anchor UPF (i.e., UPF1). When the UE in the CM-connected state moves to a base station (i.e., a target RAN) having no connectivity with the anchor UPF, a handover procedure proposed in this disclosure may be performed At step 1 (1104, 1106), a source base station (i.e., a source RAN) selects the target RAN suitable for handover of the UE, based on UE feedback (e.g., a measurement report), and transmits, to the AMF, a handover request message including identification information (e.g., RAN ID or Cell ID) of the target RAN and identification information (e.g., PDU session ID(s)) of a PDU session being currently used by the UE. Here, the PDU session being used refers to a session state in which a user plane (UP) data transmission path has been already established between the UE and the anchor UPF and thus a UL or DL data packet can be transmitted. At step 2 (1108), the AMF may deliver the PDU session handover request message to a source SMF that controls the PDU session being used by the UE.

If the source SMF that receives the PDU session handover request message determines that the target RAN has no connectivity with UPFs managed by the source SMF, the source SMF may perform a procedure for selecting a new SMF at step 3 (1110). Here, the absence of the connectivity may include a deviation from service areas of the UPFs managed by the source SMF. In this case, a new SMF that manages a service area including the target RAN may be selected. Also, a service area of the SMF may be defined as a union of service areas of UPFs that can be controlled by the SMF. The selection of the new SMF may be performed by the source SMF if there is an interface between SMFs, or otherwise by the AMF. If the newly selected SMF is called a target SMF, the source SMF may transmit a create PDU session request message to the target SMF at step 4 (1112). The create PDU session request message may include at least one of PDU session identification information, UE location information, subscriber identification information, target RAN identification information, source SMF identification information, anchor UPF identification information, CN tunnel information for N3 tunnel, and session related context (DNN, S-NSSAI, PDU type, SSC mode, IP address, etc.).

If it is determined that there is no connectivity between the anchor UPF and the target RAN in case where the SSC mode of the session is 2 or 3, the target SMF that receives the create PDU session request may select a new anchor UPF (i.e., UPF2) at step 5 (1114). The new anchor UPF may be selected from UPFs having connectivity with the target RAN. This selection may be preformed based on various parameters, such as a UE location, a load status of a UPF, a location of a UPF, and a capacity of a UPF, that can be considered by the target SMF. After selecting the new anchor UPF, the target SMF may perform an N4 session establishment procedure for the PDU session at step 6 (1116). The N4 session establishment procedure may include a process in which the SMF transmits, to the new anchor UPF, an N4 session establishment request signaling including an identification address of the target RAN and tunnel identification information used for N3 tunnel setup, and a process in which the new anchor UPF transmits, to the SMF, an N4 session establishment response signaling including an identification address of the new anchor UPF and tunnel identification information, which are used for N3 tunnel setup with the target RAN. Thereafter, in response to the create PDU session request, the target SMF may transmit a create PDU session response message to the source SMF at step 7 (1118). This response message may include at least one of PDU session identification information, subscriber identification information, target SMF identification information, new anchor UPF identification information, CN tunnel information for N3 tunnel setup, and session related context (DNN, S-NSSAI, PDU type, SSC mode, and the like).

The source SMF that receives the response message may transmit, to the AMF, a PDU session handover response message including information contained in the response message at step 8 (1120). At this time, the AMF may acquire target SMF identification information from the response message and forward session-related signaling to the target SMF. At step 9a (1122), the AMF transmits, to the target RAN, a handover request message including the PDU session handover response message received from the source SMF. Upon receiving the handover request message, the target RAN allocates a resource for the N3 tunnel setup with the intermediate UPF with respect to a PDU session allowed by the target RAN. Then, at step 9b (1122), the target RAN transmits, to the AMF, a handover request ACK message including RAN tunnel information of the session (e.g., an identification address of the target RAN and tunnel identification information) together with identification information of the session (e.g. PDU session ID). The handover request ACK message may further include session identification information and a cause indicator with respect to a PDU session disallowed by the target RAN.

Upon receiving the handover request ACK message, the AMF generates and transmits, using the identification information of a PDU session at step 10 (1124), a modify PDU session request message to the target SMF that controls the PDU session. At this time, the modify PDU session request message may include different information, depending on whether the target RAN allows or not a session. In addition, the above message may be delivered by the AMF to the target SMF via the source SMF. In case of a session allowed by the target RAN, the RAN tunnel information set up for the N3 tunnel by the target RAN may be included. Through this message, the target SMF may complete the N3 tunnel setup by providing the RAN tunnel information to the new anchor UPF at step 11 (1126).

In case of a session disallowed by the target RAN, a release PDU session request message may be transmitted to the target SMF. Through this message, the target SMF may request the new anchor UPF to release the N3 tunnel resource set up at the above step 6. In addition, for the session disallowed by the target RAN, the AMF or the target SMF may further perform a PDU session release procedure with the source SMF. Thereafter, at step 12 (1128), the target SMF may transmit a modify PDU session response message to the AMF. Then, at step 13 (1130), the AMF may transmit a handover command message to the source RAN. If the source RAN decides to perform handover to the target RAN, the handover command message is sent to the UE at step 14 (1132). Then, the UE performs synchronization 1134 with the target RAN and transmits a handover confirm message to the target RAN at step 15 (1136).

Thereafter, at step 16 (1140), the target RAN transmits a handover notify message to the AMF. Then, at step 17 (1142), the AMF transmits a handover complete message to the SMF corresponding to each PDU session being used by the UE. Thus, the SMF can know that the handover has been successfully performed. Further, the SMF may forward the handover complete message to the source SMF at step 18 (1144). Then, at step 19 (1146), the source SMF may perform an N4 session release procedure to release the resource set up for the PDU session. Thereafter, at step 20 (1148), the source SMF may transmit an ACK for the handover complete message to the target SMF. Then, at step 21 (1150), the target SMF may send the ACK for the handover complete message to the AMF. The AMF that receives the ACK may transmit a UE context release command message to the source RAN at step 22a (1154) in order to release UE context at the source RAN. At step 22b (1154), the source RAN releases all the UE contexts and then transmits a UE context release complete message to the AMF.

The names of various signaling messages used in this embodiment may be changed. Also, in this embodiment, the signaling between the source SMF and the target SMF may be delivered through the AMF.

Another embodiment relates to a new procedure for changing the anchor UPF of the SSC Mode 2 session. Referring to FIGS. 12A and 12B, at step 1 (1204), the SMF that manages the PDU session determines that a data transmission path via UPF2 (a new anchor UPF) rather than UPF1 (an existing anchor UPF) is more advantageous. At this time, the SMF also checks whether a currently used IP address can be reused. This embodiment corresponds to the case of allocating a new IP address.

At step 2a (1206), the SMF transmits an indication, called PDU session unavailable temporarily, to the UE through a NAS signaling message so that the UE cannot temporarily use the session corresponding to the PDU session ID. In case of the IPv6 session type, the NAS signaling may be transmitted using an IPv6 router advertisement message. At this time, the value of a valid lifetime which is an option field of the router advertisement message may be set to 0. In addition, the SMF may send, to the UE, a PDU session ID and an indication that an anchor UPF relocation of the session is required. The UE that receives the NAS message may not transmit mobile originated (MO) traffic through the corresponding session until receiving an indication called PDU session available now. If the UE receives the indication that the anchor UPF relocation is required, the UE may transmit a NAS message including the PDU session ID and an ACK for anchor UPF relocation to the SMF via the AMF at step 2b (1208).

The SMF may perform the following operation immediately after transmitting the NAS signaling message at step 2a or when receiving the ACK for the NAS signaling from the UE at step 2b. That is, the SMF releases the PDU session context allocated in the existing anchor UPF at step 3 (1210), and establishes the PDU session context with a new anchor UPF at step 4 (1212). The steps 2 and 3 may be performed in the reverse order. When the session establishment with the new anchor UPF is completed, the SMF transmits an N3 tunnel modification command message including the N3 tunnel information to the (R)AN via the AMF at steps 5 and 6a (1214 and 1216). Upon receiving the N2 message, the (R)AN updates the N3 tunnel of the corresponding session by referring to the PDU Session ID and forwards an ACK to the SMF at steps 6b and 7 (1216 and 1218).

Upon receiving the ACK, the SMF recognizes that the anchor UPF relocation of the SSC Mode 2 session has been completed, and transmits a NAS signaling message including the PDU session ID and the PDU session available now indicator to the UE at step 8a (1220). This NAS signaling message transmitted to the UE may include a message allowing the UE to know that the anchor UPF relocation of the session has been completed. The UE that receives the NAS message can operate in a state in which data transmission/reception is possible through the corresponding PDU session. Also, when a new IP address is delivered together, the UE updates the QoS mapping (or QoS rule) belonging to the PDU session, based on the new IP address. In addition, the step 8a may be piggybacked with the steps 5 and 6a and the NAS message may be finally delivered to the UE. Similarly, the step 8b may be piggybacked with the steps 6b and 7 and the NAS message may be finally transmitted to the SMF. In case of the IPv6 session type, the SMF may further transmit a router advertisement message including a new IP prefix to the UE via the new anchor UPF at step 9 (1222). In addition, the above-described step 3 for releasing the session with the existing anchor UPF may be performed after the path establishment with the new anchor UPF is completed (e.g., after step 7). Likewise, the names of the messages used in this embodiment may be changed.

Figure 13:
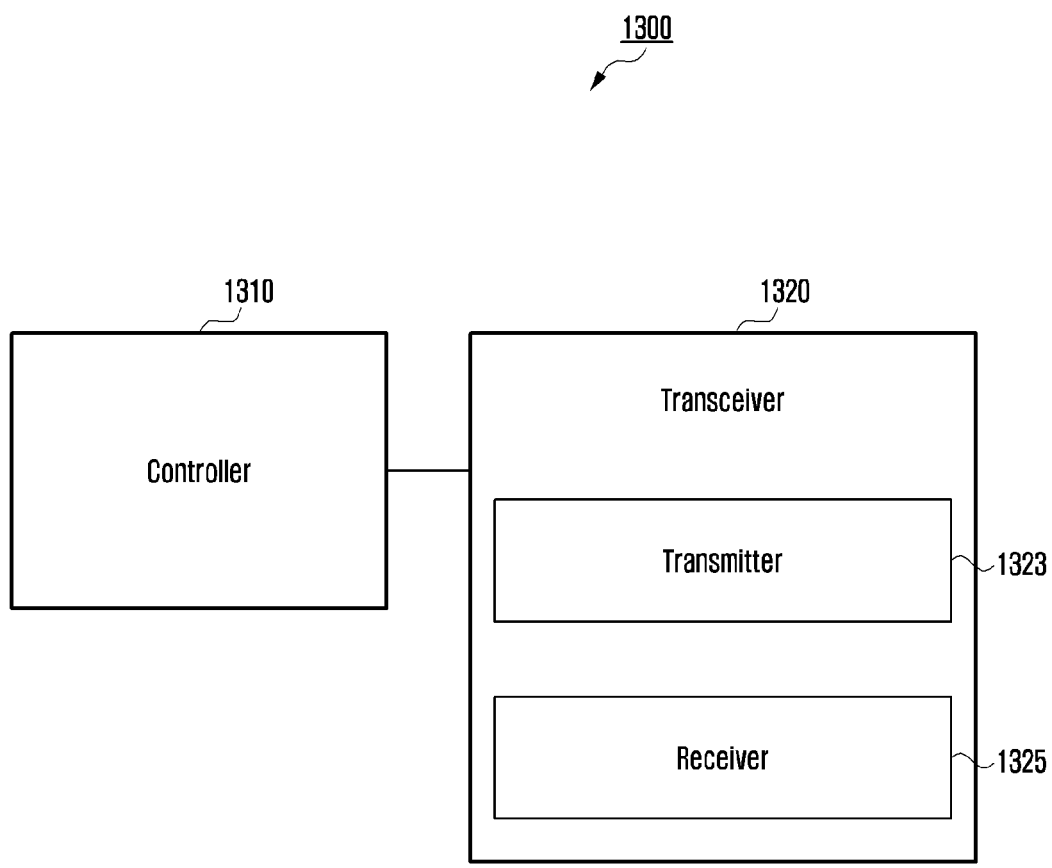
FIG. 13 is a diagram illustrating a configuration of a terminal according to the present disclosure.

FIG. 13 is a diagram illustrating a configuration of a terminal according to the present disclosure.

The terminal according to an embodiment may include a transceiver 1320 and a controller 1310 for controlling the overall operation of the terminal. The transceiver 1320 may include a transmitter 1323 and a receiver 1325.

The transceiver 1320 may transmit and receive signals to and from other network entities.

The controller 1310 may control a signal flow between respective blocks to perform the above-described operations. The controller 1310 and the transceiver 1320 are not necessarily implemented as separate modules, and may be implemented as a single unit such as a single chip. The controller 1310 and the transceiver 1320 may be electrically coupled to each other. For example, controller 1310 may be a circuit, an application-specific circuit, or at least one processor. In addition, the operations of the terminal may be realized by providing the terminal with a memory device storing corresponding program codes.

Figure 14:
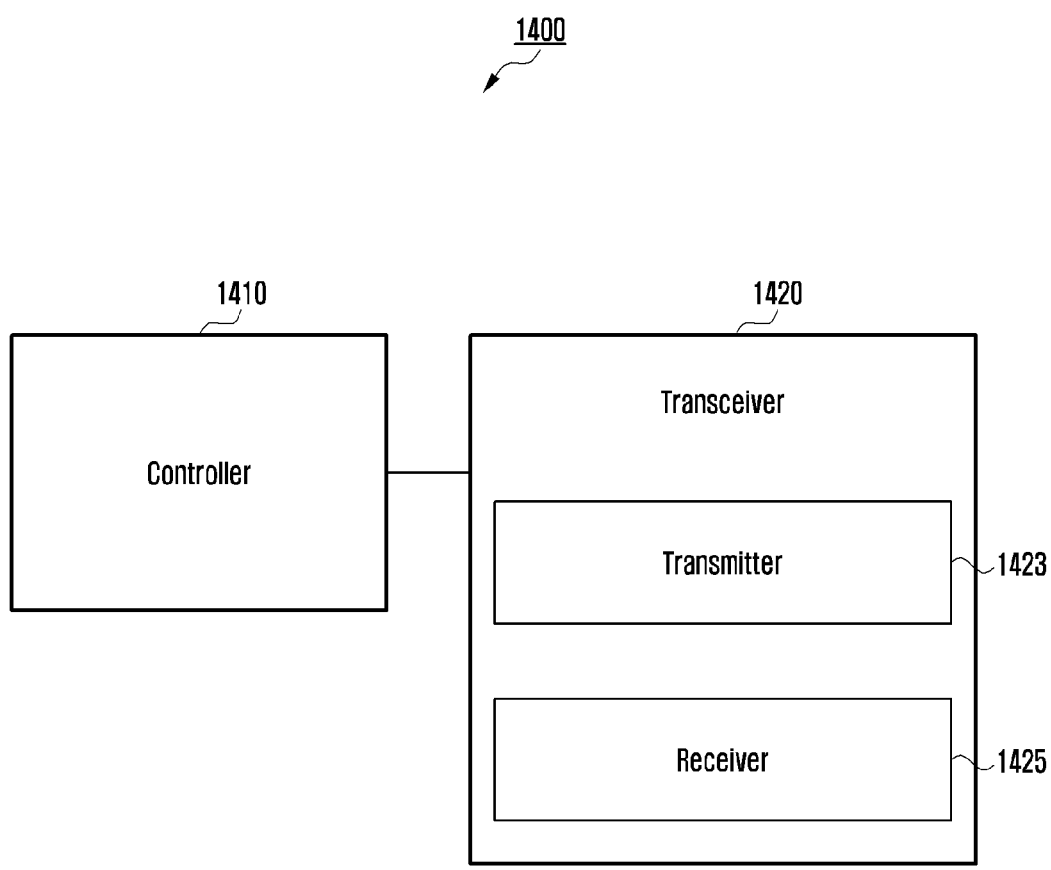
FIG. 14 is a diagram illustrating a configuration of a base station according to the present disclosure.

FIG. 14 is a diagram illustrating a configuration of a base station according to the present disclosure.

The base station according to an embodiment may include a transceiver 1420 and a controller 1410 for controlling the overall operation of the base station. The transceiver 1420 may include a transmitter 1423 and a receiver 1425.

The transceiver 1420 may transmit and receive signals to and from other network entities.

The controller 1410 may control a signal flow between respective blocks to perform the above-described operations. The controller 1410 and the transceiver 1420 are not necessarily implemented as separate modules, and may be implemented as a single unit such as a single chip. The controller 1410 and the transceiver 1420 may be electrically coupled to each other. For example, controller 1410 may be a circuit, an application-specific circuit, or at least one processor. In addition, the operations of the base station may be realized by providing the terminal with a memory device storing corresponding program codes.

Figure 15:
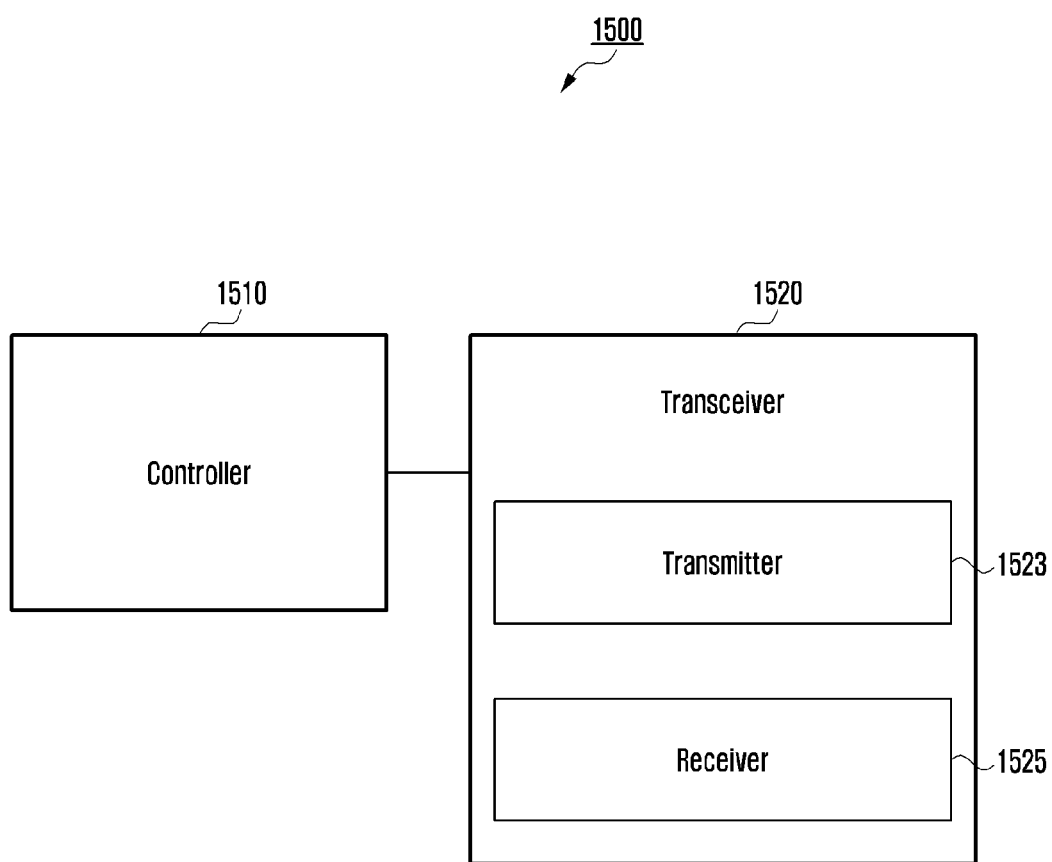
FIG. 15 is a diagram illustrating a configuration of a network entity according to the present disclosure.

FIG. 15 is a diagram illustrating a configuration of a network entity according to the present disclosure.

The network entity according to an embodiment may include a transceiver 1520 and a controller 1510 for controlling the overall operation of the network entity. The transceiver 1520 may include a transmitter 1523 and a receiver 1525.

The transceiver 1520 may transmit and receive signals to and from other network entities.

The controller 1510 may control a signal flow between respective blocks to perform the above-described operations. The controller 1510 and the transceiver 1520 are not necessarily implemented as separate modules, and may be implemented as a single unit such as a single chip. The controller 1510 and the transceiver 1520 may be electrically coupled to each other. For example, controller 1510 may be a circuit, an application-specific circuit, or at least one processor. In addition, the operations of the network entity may be realized by providing the terminal with a memory device storing corresponding program codes.

While the present disclosure has been particularly shown and described with reference to embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) for supporting session continuity during a handover of a terminal in a wireless communication system, the method comprising:
   receiving, from an access and mobility management function (AMF), an update request for a protocol data unit (PDU) session associated with the terminal;
   determining whether an anchor user plane function (UPF) for the PDU session is able to continue to serve the terminal;
   selecting an intermediate UPF for the PDU session, in case that the anchor UPF is not able to continue to serve the terminal; and
   transmitting, to the intermediate UPF, an establishment request for insertion of the intermediate UPF,
   wherein the intermediate UPF is an additional UPF for the PDU session and has a connectivity between the anchor UPF and a target base station associated with the handover of the terminal.

2. The method of claim 1,
   wherein the method further comprises:
   transmitting, to the anchor UPF, a modification request for the PDU session; and
   receiving, from the anchor UPF, a modification response as a response to the modification request.

3. The method of claim 2, further comprising transmitting, to the AMF, an update response as a response to the update request, and
   wherein the update response includes information on a core network (CN) tunnel associated with the intermediate UPF.

4. The method of claim 3, further comprising receiving, from the intermediate UPF, an establishment response as a response to the establishment request.

5. The method of claim 1, wherein the intermediate UPF is selected based on at least one of a location of the terminal, a load status of the intermediate UPF, a location of the intermediate UPF, or a capacity of the intermediate UPF.

6. The method of claim 1, wherein the intermediate UPF is inserted between the anchor UPF and the target base station.

7. An apparatus for a session management function (SMF) for supporting session continuity during a handover of a terminal in a wireless communication system, the apparatus comprising:
a transceiver; and
a controller configured to:
receive, from an access and mobile management function (AMF), an update request for a protocol data unit (PDU) session associated with the terminal, determine whether an anchor user plane function (UPF) for the PDU session is able to continue to serve the terminal,
select an intermediate UPF for the PDU session, in case that the anchor UPF is not able to continue to serve the terminal, and
transmit, to the intermediate UPF, an establishment request for insertion of the intermediate UPF,
wherein the intermediate UPF is an additional UPF for the PDU session and has a connectivity between the anchor UPF and a target base station associated with the handover of the terminal.

8. The apparatus of claim 7,
wherein the controller is further configured to:
transmit, to the anchor UPF, a modification request for the PDU session, and
receive, from the anchor UPF, a modification response as a response to the modification request.

9. The apparatus of claim 8, wherein the controller is further configured to transmit, to the AMF, an update response as a response to the update request, and
wherein the update response includes information on a core network (CN) tunnel associated with the intermediate UPF.

10. The apparatus of claim 9, wherein the controller is further configured to receive, from the intermediate UPF, an establishment response as a response to the establishment request.

11. The apparatus of claim 7, wherein the intermediate UPF is selected based on at least one of a location of the terminal, a load status of the intermediate UPF, a location of the intermediate UPF, or a capacity of the intermediate UPF.

12. The apparatus of claim 7, wherein the intermediate UPF is inserted between the anchor UPF and the target base station.

13. A system comprising:
user plane functions (UPFs);
an access and mobility management function (AMF); and
a session management function (SMF) for supporting session continuity during a handover of a terminal connected to the system, wherein the SMF is configured to:
receive, from the AMF, an update request for a protocol data unit (PDU) session associated with the terminal,
determine whether a UPF of the UPFs, which is an anchor UPF for the PDU session, is able to continue to serve the terminal,
select from the UPFs an intermediate UPF for the PDU session, in case that the anchor UPF is not able to continue to serve the terminal, and
transmit, to the intermediate UPF, an establishment request for insertion of the intermediate UPF, wherein the intermediate UPF is an additional UPF for the PDU session and has a connectivity between the anchor UPF and a target base station associated with the handover of the terminal.

14. The system of claim 13,
wherein the SMF is further configured to:
transmit, to the anchor UPF, a modification request for the PDU session, and
receive, from the anchor UPF, a modification response as a response to the modification request.

15. The system of claim 14, wherein the SMF is further configured to transmit, to the AMF, an update response as a response to the update request, and
wherein the update response includes information on a core network (CN) tunnel associated with the intermediate UPF.

16. The system of claim 15, wherein the SMF is further configured to receive, from the intermediate UPF, an establishment response as a response to the establishment request.

17. The system of claim 13, wherein the intermediate UPF is selected from the UPFs based on at least one of a location of the terminal, a load status of the intermediate UPF, a location of the intermediate UPF, or a capacity of the intermediate UPF.

18. The system of claim 13, wherein the intermediate UPF is inserted between the anchor UPF and the target base station.

* * * * *